(12) United States Patent
Sant et al.

(10) Patent No.: US 11,247,940 B2
(45) Date of Patent: Feb. 15, 2022

(54) EFFICIENT INTEGRATION OF MANUFACTURING OF UPCYCLED CONCRETE PRODUCT INTO POWER PLANTS

(71) Applicants: THE REGENTS OF THE UNIVERSITY OF CALIFORNIA, Oakland, CA (US); ARIZONA BOARD OF REGENTS ON BEHALF OF ARIZONA STATE UNIVERSITY, Tempe, AZ (US)

(72) Inventors: Gaurav Sant, Los Angeles, CA (US); Laurent G. Pilon, Los Angeles, CA (US); Bu Wang, Los Angeles, CA (US); Narayanan Neithalath, Chandler, AZ (US); Zhenhua Wei, Los Angeles, CA (US); Benjamin Young, Los Angeles, CA (US); Gabriel D. Falzone, Los Angeles, CA (US); Dante Simonetti, Los Angeles, CA (US)

(73) Assignees: The Regents of the University of California, Oakland, CA (US); Arizona Board of Regents, Tempe, AZ (US)

( * ) Notice: Subject to any disclaimer, the term of this patent is extended or adjusted under 35 U.S.C. 154(b) by 383 days.

(21) Appl. No.: 16/147,261

(22) Filed: Sep. 28, 2018

(65) Prior Publication Data

US 2019/0177220 A1 Jun. 13, 2019

Related U.S. Application Data

(63) Continuation-in-part of application No. PCT/US2017/058359, filed on Oct. 25, 2017.
(Continued)

(51) Int. Cl.
*C04B 7/19* (2006.01)
*C04B 7/38* (2006.01)
(Continued)

(52) U.S. Cl.
CPC ............... *C04B 7/19* (2013.01); *C04B 7/367* (2013.01); *C04B 7/38* (2013.01); *C04B 7/46* (2013.01);
(Continued)

(58) Field of Classification Search
CPC ............... B01J 19/00; B01J 19/08–087; B01J 19/24–245; B01J 2219/24; C04B 7/00;
(Continued)

(56) References Cited

U.S. PATENT DOCUMENTS 7,413,014 B2   8/2008   Chatterji et al.
7,879,305 B2   2/2011   Reddy et al.
(Continued)

FOREIGN PATENT DOCUMENTS

WO   WO-2010/006242 A1   1/2010
WO   WO-2014/005227 A1   1/2014
(Continued)

OTHER PUBLICATIONS

International Search Report and Written Opinion, issued in International Application No. PCT/US2017/058359, 8 pages (dated Jan. 9, 2018).
(Continued)

*Primary Examiner* — Natasha E Young
(74) *Attorney, Agent, or Firm* — Foley Hoag LLP

(57) ABSTRACT

A manufacturing process of a concrete product includes: (1) extracting calcium from solids as portlandite; (2) forming a cementitious slurry including the portlandite; (3) shaping the cementitious slurry into a structural component; and (4)
(Continued)

exposing the structural component to carbon dioxide sourced from a flue gas stream, thereby forming the concrete product.

20 Claims, 12 Drawing Sheets

Related U.S. Application Data

(60) Provisional application No. 62/566,091, filed on Sep. 29, 2017, provisional application No. 62/413,365, filed on Oct. 26, 2016.

(51) Int. Cl.

| | | |
|---|---|---|
| *C04B 7/46* | (2006.01) | |
| *C04B 9/20* | (2006.01) | |
| *C04B 28/04* | (2006.01) | |
| *B01J 19/00* | (2006.01) | |
| *B01J 19/08* | (2006.01) | |
| *B01J 19/24* | (2006.01) | |
| *C04B 40/02* | (2006.01) | |
| *C04B 7/36* | (2006.01) | |
| *C04B 111/00* | (2006.01) | |

(52) U.S. Cl.
CPC .............. *C04B 9/20* (2013.01); *C04B 28/04* (2013.01); *C04B 40/0231* (2013.01); *B01J 19/087* (2013.01); *B01J 19/245* (2013.01); *B01J 2219/24* (2013.01); *C04B 2111/00017* (2013.01); *C04B 2111/00129* (2013.01)

(58) Field of Classification Search
CPC ........... C04B 7/14; C04B 7/147; C04B 7/153; C04B 7/17; C04B 7/19; C04B 7/36; C04B 7/364; C04B 7/367; C04B 7/38; C04B 7/43; C04B 7/44; C04B 7/46; C04B 9/00; C04B 9/20; C04B 40/00; C04B 40/02; C04B 40/0231; C04B 2111/00; C04B 2111/00017; C04B 2111/00034; C04B 2111/00129; Y02P 40/00; Y02P 40/10; Y02P 40/121; Y02P 40/18; Y02W 30/00; Y02W 30/50; Y02W 30/91

See application file for complete search history.

(56) References Cited

U.S. PATENT DOCUMENTS

| | | |
|---|---|---|
| 8,088,292 B2 | 1/2012 | Neumann et al. |
| 8,163,066 B2 | 4/2012 | Eisenberger |
| 8,252,242 B2 | 8/2012 | Vandor |
| 8,262,777 B2 | 9/2012 | Neumann et al. |
| 8,383,072 B2 | 2/2013 | Smedley et al. |
| 8,507,228 B2 | 8/2013 | Simpson et al. |
| 8,852,319 B2 | 10/2014 | Wijmans et al. |
| 8,864,876 B2 | 10/2014 | Neumann et al. |
| 8,894,747 B2 | 11/2014 | Eisenberger et al. |
| 9,061,237 B2 | 6/2015 | Eisenberger et al. |
| 9,163,297 B2 | 10/2015 | Langley |
| 9,205,371 B2 | 12/2015 | Cooper et al. |
| 9,227,153 B2 | 1/2016 | Eisenberger |
| 9,382,120 B2 | 7/2016 | Dakhil |
| 9,433,886 B2 | 9/2016 | Smedley et al. |
| 9,440,189 B2 | 9/2016 | Mercier et al. |
| 9,469,547 B2 | 10/2016 | Kniesburges |
| 9,475,000 B2 | 10/2016 | Benyahia |
| 9,555,365 B2 | 1/2017 | Eisenberger et al. |
| 9,714,406 B2 | 7/2017 | Constantz et al. |
| 9,786,940 B2 | 10/2017 | Langley |
| 9,789,439 B2 | 10/2017 | Siller et al. |
| 9,808,759 B2 | 11/2017 | Balfe et al. |
| 9,861,931 B2 | 1/2018 | Kuopanportti et al. |
| 2009/0081096 A1 | 3/2009 | Pellegrin |
| 2010/0083880 A1 | 4/2010 | Constantz et al. |
| 2014/0356267 A1* | 12/2014 | Hunwick ............... B01D 53/96 423/220 |
| 2017/0182458 A1 | 6/2017 | Jiang et al. |

FOREIGN PATENT DOCUMENTS

| | | | |
|---|---|---|---|
| WO | WO-2015/154174 A1 | 10/2015 | |
| WO | WO-2016/061251 A1 | 4/2016 | |
| WO | WO-2016061251 A1 * | 4/2016 | ........... B28B 11/245 |

OTHER PUBLICATIONS

Examination Report on IN 201927016758 dated Dec. 14, 2020 (5 pages).
Extended European Search Report on EP Application No. 17865241.8 dated May 15, 2020, 6 pages.
International Preliminary Report on Patentability for PCT/US2017/058359 dated May 9, 2019, 7 pages.
Murnandari et al., "Effect of process parameters on the CaCO3 production in the single process for carbon capture and mineralization", Korean Journal of Chemical Engineering, Mar. 2017, vol. 34, Issue 3, pp. 935-941.
Ramasubramanian et al., "Membrane processes for carbon capture from coal-fired power plant flue gas: A modeling and cost study," Journal of Membrane Science (2012) 421-422: 299-310.
Reddy et al., "Simultaneous capture and mineralization of coal combustion flue gas carbon dioxide (CO2)," Energy Procedia, 4, (2011), pp. 1574-1583.
Vance et al., "Direct Carbonation of Ca(OH)2 Using Liquid and Supercritical CO2: Implications for Carbon-Neutral Cementation", Industrial & Engineering Chemistry Research, 2015, 54 (36), pp. 8908-8918.
Office Action on CN 201780076640.2 dated May 7, 2021.

* cited by examiner

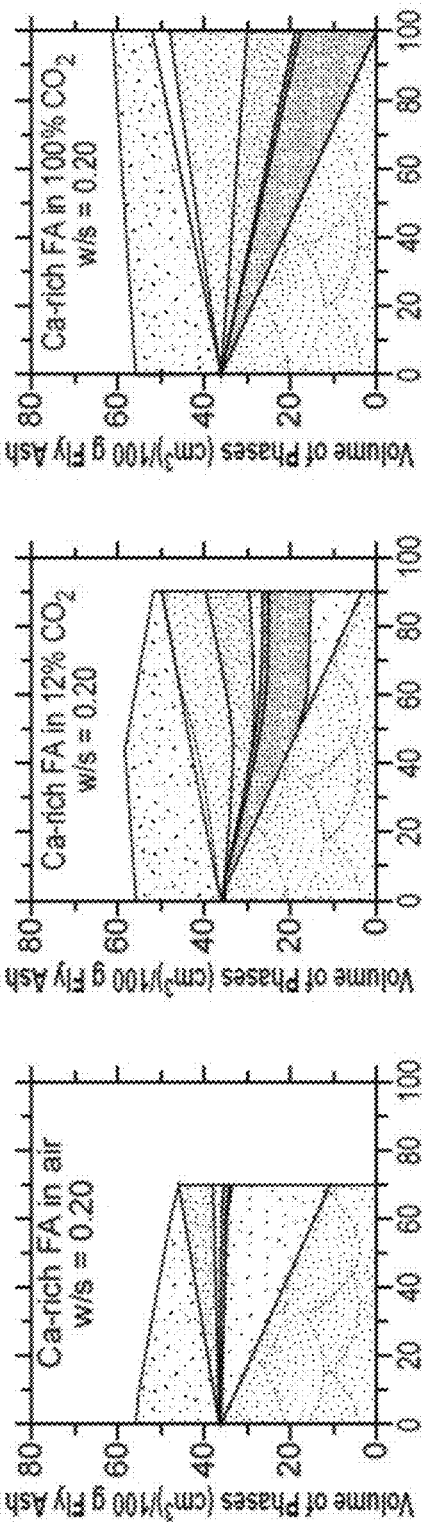
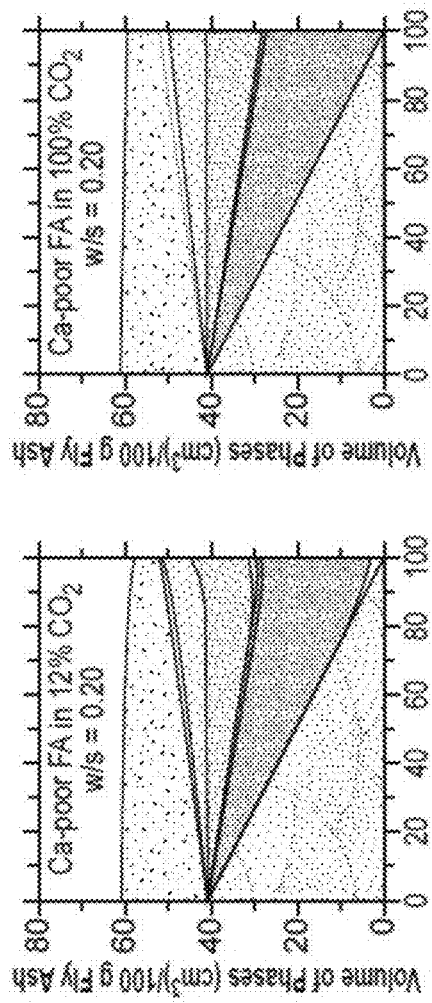
FIG. 7A Ca-rich FA in air w/s = 0.20
FIG. 7B Ca-rich FA in 12% CO₂ w/s = 0.20
FIG. 7C Ca-rich FA in 100% CO₂ w/s = 0.20
FIG. 7D Ca-poor FA in air w/s = 0.20
FIG. 7E Ca-poor FA in 12% CO₂ w/s = 0.20
FIG. 7F Ca-poor FA in 100% CO₂ w/s = 0.20

EFFICIENT INTEGRATION OF MANUFACTURING OF UPCYCLED CONCRETE PRODUCT INTO POWER PLANTS

CROSS-REFERENCE TO RELATED APPLICATIONS

This application is a continuation-in-part of International Application No. PCT/US2017/058359, now WO 2018/081310, filed Oct. 25, 2017, which claims the benefit of U.S. Provisional Application No. 62/413,365, filed Oct. 26, 2016, the contents of which are incorporated herein by reference in their entirety. This application also claims the benefit of U.S. Provisional Application No. 62/566,091, filed Sep. 29, 2017, the contents of which are incorporated herein by reference in their entirety.

STATEMENT REGARDING FEDERALLY SPONSORED RESEARCH OR DEVELOPMENT

This invention was made with Government support under grant number 1253269, awarded by the National Science Foundation. The Government has certain rights in the invention.

TECHNICAL FIELD

This disclosure generally relates to manufacturing processes of concrete products and systems for manufacturing concrete products.

BACKGROUND

Electricity generation from coal-fired power plants represents about 25% of total carbon dioxide ($CO_2$) emissions from the United States (about 1.4 billion tons of $CO_2$ emitted in 2015). In view of regulations that seek to restrict $CO_2$ emissions in support of climate change goals, it is expected that such emissions will be financially penalized. The expected restriction is of great consequence to emission intensive sectors such as coal-fired power generation, which are expected to be substantially burdened by such penalties.

Carbon capture and storage (CCS) has been proposed as a solution to mitigate anthropogenic $CO_2$ emissions. However, CCS is not always a viable solution, for: (i) reasons of cost which is estimated to range from about $60-to-$150 (in terms of US dollars) per ton of $CO_2$, (ii) the permanence (or lack thereof) of a sequestration solution, and/or (iii) the lack of suitable geological features in a local vicinity where CCS can be favorably achieved. This is further complicated by increasing levels of anthropogenic $CO_2$ emissions which render current proposals of CCS a short-term solution.

Technologies have been proposed to produce concrete products by utilizing $CO_2$ to carbonate portlandite or wollastonite. However, the proposed technologies specify the use of newly mined or produced materials as precursors, and involve energy-intensive processing and, hence, high costs, which can impede the propagation of such technologies as a viable solution to mitigate anthropogenic $CO_2$ emissions. Moreover, carbon capture and utilization (CCU) based on mineralization of carbon dioxide ($CO_2$) (carbonation) relies on achieving a high reaction speed (thus a high production throughput) with a low energy input. However, in a typical carbonation reaction, $CO_2$ is consumed and removed from a gas mixture continuously during the reaction. Therefore in a closed system, the $CO_2$ concentration and its partial pressure reduce as the reaction proceeds. This substantially impacts the late stage reaction speed and restricts a final carbonation extent.

It is against this background that a need arose to develop the embodiments described herein.

SUMMARY

In some embodiments, a manufacturing process of a concrete product includes: (1) extracting calcium from solids as portlandite; (2) forming a cementitious slurry including the portlandite; (3) shaping the cementitious slurry into a structural component; and (4) exposing the structural component to carbon dioxide sourced from a flue gas stream, thereby forming the concrete product.

In some embodiments of the manufacturing process, the solids include at least one of iron slag or steel slag.

In some embodiments of the manufacturing process, extracting the calcium includes subjecting the solids to dissolution in a reactor to yield an ion solution, and wherein the leaching reactor is operated using heat sourced from the flue gas stream.

In some embodiments of the manufacturing process, extracting the calcium further includes inducing precipitation of the ion solution in a precipitation reactor to yield the portlandite, and wherein the precipitation reactor is operated using heat sourced from the flue gas stream.

In some embodiments of the manufacturing process, forming the cementitious slurry includes combining fly ash, bottom ash, economizer ash including so called off-spec ashes, or other combustion residuals with the portlandite.

In some embodiments of the manufacturing process, shaping the cementitious slurry includes casting, extruding, molding, pressing, or 3D printing of the cementitious slurry.

In some embodiments of the manufacturing process, exposing the structural component includes exposing, during an initial time period, the structural component to a first gas reactant having a first carbon dioxide concentration, followed by exposing, during a subsequent time period, the structural component to a second gas reactant having a second carbon dioxide concentration that is greater than the first carbon dioxide concentration.

In additional embodiments, a system for manufacturing a concrete product includes: (1) a leaching reactor; (2) a precipitation reactor connected to the leaching reactor; and (3) a set of heat exchangers thermally connected to the leaching reactor and the precipitation reactor and configured to source heat from a flue gas stream.

In some embodiments of the system, the set of heat exchangers includes a set of finned-tube heat exchangers.

In some embodiments of the system, the system further includes a capacitive concentrator connected between the leaching reactor and the precipitation reactor. In some embodiments, the capacitive concentrator includes a set of electrodes and an electrical source connected to the set of electrodes.

In some embodiments of the system, the system further includes a carbonation reactor connected to the leaching reactor and the precipitation reactor and configured to source carbon dioxide from the flue gas stream.

In some embodiments of the system, the system further includes a mixer connected between the leaching reactor, the precipitation reactor, and the carbonation reactor.

In some embodiments of the system, the system further includes an extruder or a pressing, molding, or forming device connected between the mixer and the carbonation reactor.

In some embodiments of the system, the carbonation reactor includes: (i) a reaction chamber; and (ii) a gas exchange mechanism connected to the reaction chamber and configured to: expose, during an initial time period, contents of the reaction chamber to a first gas reactant having a first carbon dioxide concentration; and expose, during a subsequent time period, the contents to a second gas reactant having a second carbon dioxide concentration that is greater than the first carbon dioxide concentration.

In additional embodiments, a manufacturing process of a concrete product includes: (1) forming a cementitious slurry including fly ash; (2) shaping the cementitious slurry into a structural component; and (3) exposing the structural component to carbon dioxide sourced from a flue gas stream, thereby forming the concrete product.

In some embodiments of the manufacturing process, forming the cementitious slurry includes combining water with the fly ash.

In some embodiments of the manufacturing process, the fly ash includes calcium in the form of one or more calcium-bearing compounds (e.g., lime (CaO)) in an amount of at least about 15% by weight, at least about 18% by weight, at least about 20% by weight, at least about 23% by weight, or at least about 25% by weight, and up to about 27% by weight, up to about 28% by weight, or more, along with silica ($SiO_2$) and oxides of metals.

In some embodiments of the manufacturing process, shaping the cementitious slurry includes casting, extruding, molding, pressing, or 3D printing of the cementitious slurry.

In some embodiments of the manufacturing process, the flue gas stream has a carbon dioxide concentration equal to or greater than about 3% (v/v).

In some embodiments of the manufacturing process, exposing the structural component includes exposing, during an initial time period, the structural component to a first gas reactant having a first carbon dioxide concentration, followed by exposing, during a subsequent time period, the structural component to a second gas reactant having a second carbon dioxide concentration that is greater than the first carbon dioxide concentration.

In additional embodiments, a manufacturing process includes: (1) introducing, during a first stage, a first gas reagent including carbon dioxide to react with a carbon dioxide-capturing reagent, followed by (2) introducing, during a second stage, a second gas reagent including carbon dioxide to react with the carbon dioxide-capturing reagent.

In some embodiments of the manufacturing process, a concentration of carbon dioxide in the second gas reagent, as introduced, is greater than a remaining concentration of carbon dioxide in the first gas reagent upon completion of the first stage.

In some embodiments of the manufacturing process, a concentration of carbon dioxide in the second gas reagent, as introduced, is greater than, or substantially the same as, a concentration of carbon dioxide in the first gas reagent, as introduced. In some embodiments, the concentration of carbon dioxide in the second gas reagent, as introduced, is at least about 1.1 times greater than, at least about 1.3 times greater than, at least about 1.5 times greater than, at least about 2 times greater than, at least about 2.5 times greater than, or at least about 3 times greater than the concentration of carbon dioxide in the first gas reagent, as introduced.

In some embodiments of the manufacturing process, introducing the second gas reagent includes replacing the first gas reagent with the second gas reagent.

In some embodiments of the manufacturing process, the carbon dioxide-capturing reagent includes at least one of portlandite or brucite ($Mg(OH)_2$).

In some embodiments of the manufacturing process, a partial pressure of carbon dioxide in the second gas reagent, as introduced, is in a range of about 0.004 MPa to about 0.02 MPa, about 0.1 MPa to about 2 MPa, about 0.5 MPa to about 1.5 MPa, about 0.8 MPa to about 1.2 MPa, or about 1 MPa. In some embodiments, the partial pressure of carbon dioxide in the second gas reagent, as introduced, is greater than a remaining partial pressure of carbon dioxide in the first gas reagent upon completion of the first stage. In some embodiments, the partial pressure of carbon dioxide in the second gas reagent, as introduced, is greater than, or substantially the same as, a partial pressure of carbon dioxide in the first gas reagent, as introduced. In some embodiments, the partial pressure of carbon dioxide in the second gas reagent, as introduced, is at least about 1.1 times greater than, at least about 1.3 times greater than, at least about 1.5 times greater than, at least about 2 times greater than, at least about 2.5 times greater than, or at least about 3 times greater than the partial pressure of carbon dioxide in the first gas reagent, as introduced. In some embodiments, the partial pressure of carbon dioxide in the first gas reagent changes (e.g., decreases) over the duration of the first stage, relative to the partial pressure of carbon dioxide in the first gas reagent, as introduced. In some embodiments, the partial pressure of carbon dioxide in the second gas reagent changes (e.g., decreases) over the duration of the second stage, relative to the partial pressure of carbon dioxide in the second gas reagent, as introduced.

In further embodiments, a carbonation reactor includes: (1) a reaction chamber; and (2) a gas exchange mechanism connected to the reaction chamber, wherein the gas exchange mechanism is configured to: introduce, during a first stage, a first gas reagent including carbon dioxide into the reaction chamber to react with contents of the reaction chamber; and introduce, during a second stage, a second gas reagent including carbon dioxide into the reaction chamber to react with the contents of the reaction chamber. In some embodiments, a partial pressure of carbon dioxide in the first gas reagent changes (e.g., decreases) over the duration of the first stage, relative to the partial pressure of carbon dioxide in the first gas reagent, as introduced. In some embodiments, a partial pressure of carbon dioxide in the second gas reagent changes (e.g., decreases) over the duration of the second stage, relative to the partial pressure of carbon dioxide in the second gas reagent, as introduced.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawing.

FIG. 7. GEMS-calculated solid phase balances as a function of the extent of fly ash reaction for Ca-rich and Ca-poor fly ash in the presence of a gas-phase composed of: (a, d) air in FIG. 7A and FIG. 7D, (b, e) about 12% $CO_2$ (simulated flue gas environment) in FIG. 7B and FIG. 7E, and (c, f) about 100% $CO_2$ at T=75° C. and p=1 bar for w/s=0.20 in FIG. 7C and FIG. 7F. Here, $\frac{1}{2}FH_3=Fe(OH)_3$, $\frac{1}{2}AH_3=Al(OH)_3$, and C—S—H=calcium silicate hydrate. The solid phase balance is calculated until the pore solution is exhausted, or the fly ash reactant is completely consumed.

DETAILED DESCRIPTION

Embodiments of this disclosure are directed to an upcycled concrete product. In some embodiments, the use of limestone as a cementation agent is leveraged to result in a $CO_2$-negative concrete product. The upcycled concrete product leverages a process to secure calcium species for carbonate mineralization using industrial wastes as precursors or reactants, thereby eliminating the need for newly mined or produced materials. Also, a carbonation process can efficiently utilize both $CO_2$ and waste heat carried by flue gas in a fossil fuel power plant, a cement plant, and a petrochemical facility, amongst others. In such manner, the upcycled concrete product and process can significantly enhance a $CO_2$ capturing capacity of a limestone-cement-based concrete product, and thereby can establish a $CO_2$-negative process that can mitigate $CO_2$ emission at large scales.

An upcycled concrete product is a transformative, $CO_2$-negative construction material which provides a solution for $CO_2$ and industrial waste upcycling. In some embodiments, a manufacturing process of the upcycled concrete product is designed to integrate as a bolt-on system to coal-fired power plants. Therefore, provision is made to secure flue gas, before desulfurization (or other air pollution control operations), as a heat transfer fluid, and post-desulfurization as a source of $CO_2$ (e.g., equal to or greater than about 3% $CO_2$ or about 12% $CO_2$, v/v). Thus, heat provisioned by the flue gas is used to facilitate leaching and precipitation reactions (e.g., above about 20° C., above about 25° C., or above about 35° C.), and accelerate the carbonation kinetics (e.g., above about 20° C., above about 25° C., or above about 35° C.). Furthermore, the $CO_2$ present in the flue gas is systematically consumed by mineralization. By tapping the flue gas stream at two discrete points, extrinsic energy demands for upcycled concrete processing are reduced, without imposing additional demands for emissions control.

Figure 1:
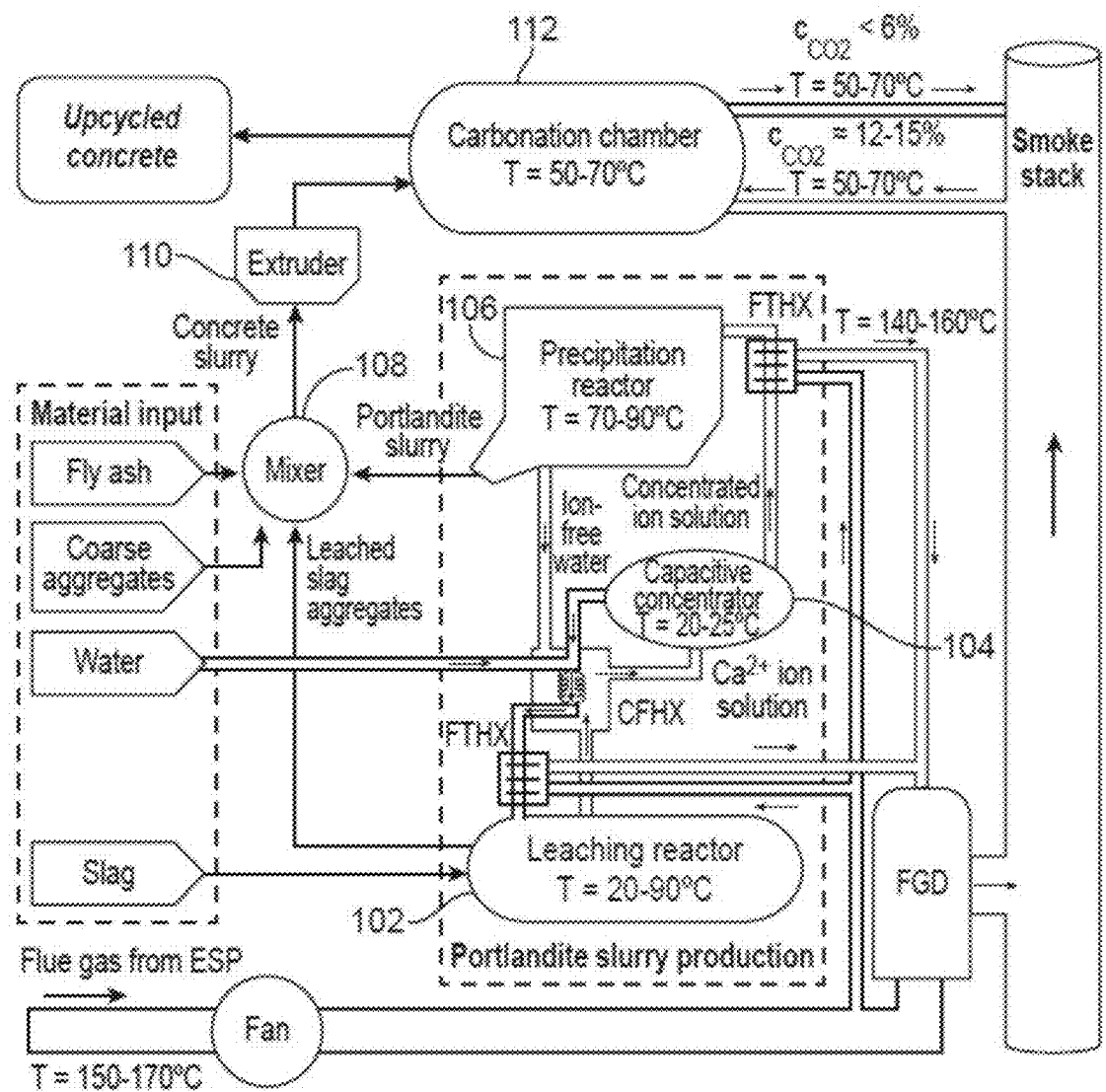
FIG. 1. An illustration of a manufacturing process flow and its integration into a primary exhaust stream of a coal-fired power plant.
Figure 2:
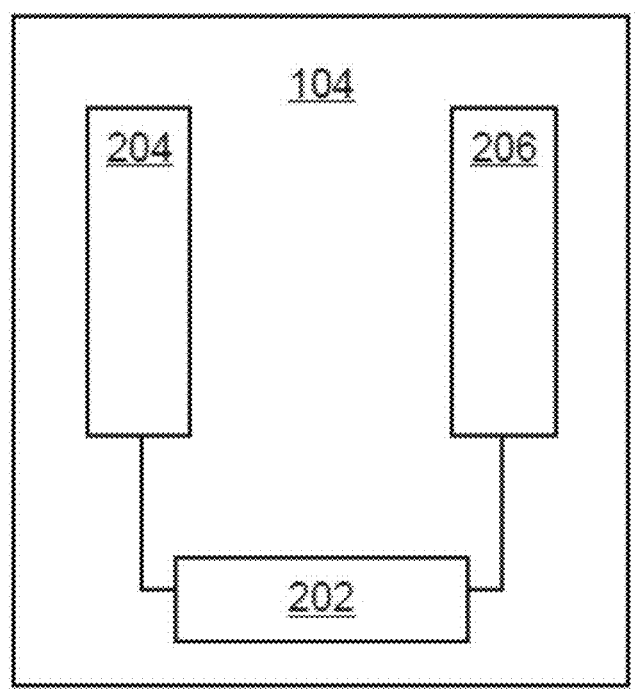
FIG. 2. An illustration of capacitive concentration.

A manufacturing process flow of some embodiments is illustrated in FIG. 1. The initial stages involve leaching and precipitation of portlandite ($Ca(OH)_2$) particulates from reclaimed solids. For example, the reclaimed solids can be in the form of either, or both, crystallized iron slags or steel slags rich in calcium (Ca) and magnesium (Mg). For example, the slags can be formed as by-products of iron and steel manufacturing, and can include calcium in the form of simple oxides (e.g., lime (CaO)) in an amount of at least about 25% by weight, at least about 30% by weight, at least about 35% by weight, or at least about 40% by weight, and up to about 45% by weight, up to about 50% by weight, or more, along with silica ($SiO_2$) and oxides of metals, such as magnesia, alumina, manganese oxide, and iron oxide. The slags can be suitably granulated in the form of granules to facilitate subsequent processing, such as through greater surface area and associated interface effects. The calcium present in the slags is leached or extracted by dissolution in, or exposure to, a leaching solution (e.g., an aqueous solution optionally including one or more leaching aids) to form a calcium ion solution in a leaching reactor 102 (e.g., a leaching tank) operated at a temperature in a range of about 20° C. to about 90° C. Then, following a controlled concentration of the calcium (in the form of calcium ions) in the leaching solution in a capacitive concentrator 104 connected to the leaching reactor 102 and operated at a temperature in a range of about 20° C. to about 25° C., a resulting concentrated ion solution is induced to precipitate portlandite to yield a portlandite slurry in a precipitation reactor 106 (e.g., a precipitation tank) connected to the capacitive concentrator 104 and operated at a temperature in a range of about 70° C. to about 90° C. In some embodiments and referring to FIG. 2, capacitive concentration is performed by applying an electrical input from an electrical source 202 to a pair of electrodes 204 and 206 included in the capacitive concentrator 104, such that calcium ions in the leaching solution are drawn towards one of the electrodes 204 and 206, and subsequently can be released by reversing the electrical input to yield a higher concentration of the calcium ions. Concentration of the calcium ions also can be performed through membrane filtration, such as using a nanofiltration membrane or a reverse osmosis membrane.

Referring to FIG. 1, the portlandite slurry and leached slag granules are then combined with water, fly ash (or other coal combustion by-products), and fine and coarse aggregates using a mixer 108 to form a cementitious slurry (e.g., either a concrete or mortar concrete slurry), which is then shape-stabilized into structural components by an extruder 110 connected to the mixer 108. Examples of suitable aggregates include sand, gravel, crushed stone, slag, recycled concrete, and so forth. Shape stabilization can yield the structural components as beams, columns, slabs, wall panels, cinder blocks, bricks, sidewalks, and so forth. Other manner of shape stabilization can be included, such as casting, molding, pressing, or 3D printing of the cementitious slurry using a pressing, molding, or forming device. The structural components are conveyed into a carbonation reactor 112 (e.g., including a carbonation chamber) operated at a temperature in a range of about 50° C. to about 70° C. to react with $CO_2$ sourced from a flue gas in a (water) condensing atmosphere at sub-boiling conditions. Specifically, during exposure to $CO_2$, portlandite within a structural component is converted into limestone (or calcium carbonate ($CaCO_3$)) by $CO_2$ mineralization. Such mineralized $CaCO_3$ can provide desirable mechanical properties and durability, as well as cementation by forming limestone around and between aggregates to bind the aggregates to one another. This stage forms a final concrete product as a mineralized, pre-fabricated upcycled concrete product. Fly ash also can serve as a calcium source, and upon slight dissolution or leaching fly ash surfaces can be activated at a relatively high pH (e.g., in portlandite-rich environments) to provide cohesion/cementation.

In some embodiments, the integration into a primary (exhaust) loop of a coal-fired power plant is achieved with two sub-systems: (I) a waste heat recycling sub-system, and (II) a two-stage carbonation sub-system.

(I) Waste Heat Recycling

Figure 3:
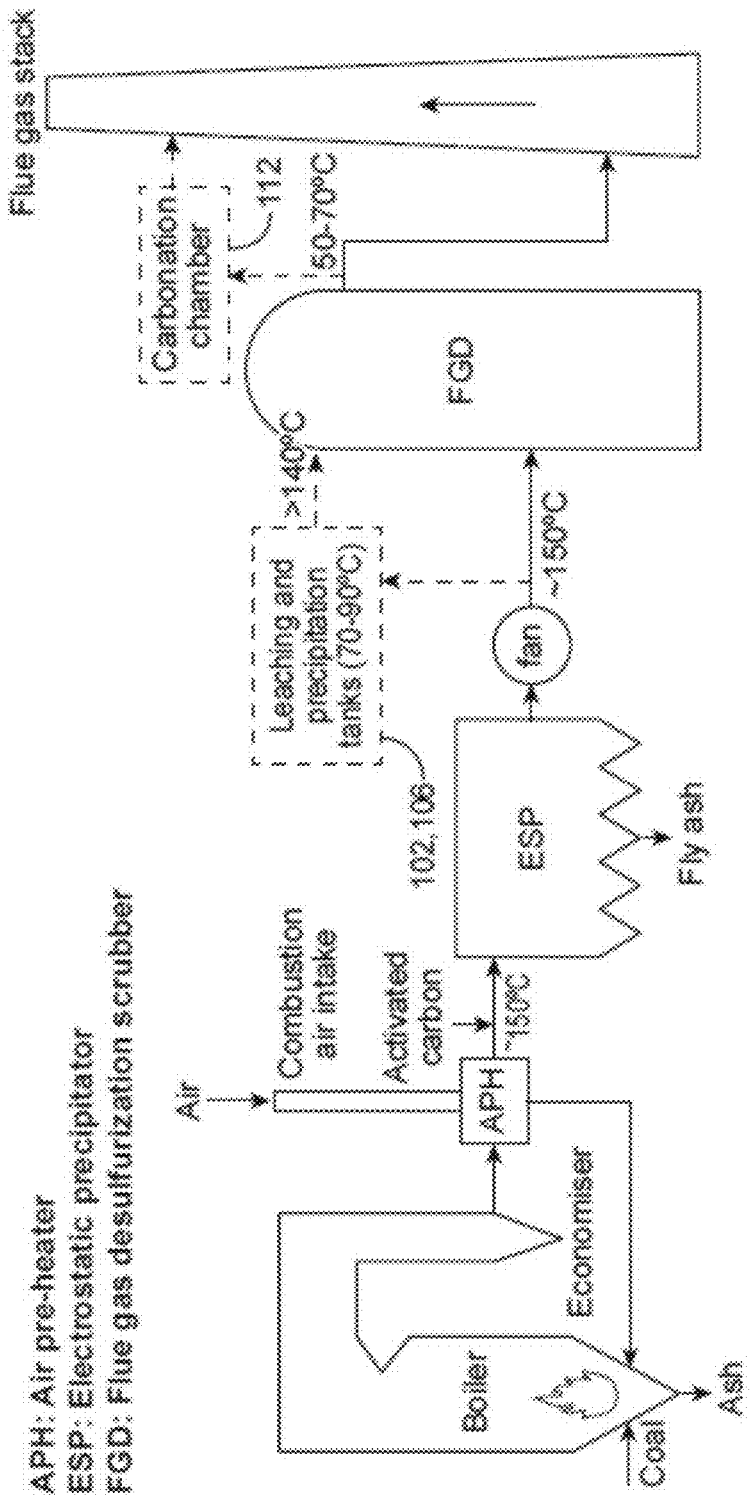
FIG. 3. An illustration of the integration of a process flow to tap a flue gas stream prior to and after desulfurization to secure waste heat, and to provide $CO_2$ for upcycled concrete production.

Referring to FIG. 3, the flue gas of a coal-fired power plant typically features an outlet temperature between about 120° C. and about 180° C. Thermal energy in the hot flue gas leaving a boiler is typically recovered by an economizer followed by an air pre-heater (APH). Flue gas heat recovery in the APH is performed until the flue gas temperature drops to about 150° C. (depending on the type of coal consumed) to mitigate against condensation of sulfuric acid ($H_2SO_4$) on a surface of the APH and downstream ducts or other sub-systems. Cooling of the flue gas below an acid dew point (e.g., about 140° C.) can lead to acid condensation and deposition which in turn can cause corrosion, fouling, and plugging of the APH, the downstream ducts, and an electrostatic precipitator (ESP). Such fouling and plugging can result in increasing pressure drop and power consumption to force the flue gas through the APH. Finally, the flue gas leaving the ESP at about 150° C. to about 170° C. can be injected with activated carbon to remove mercury (Hg) traces before entering a flue gas desulfurization scrubber (FGD). The FGD can be a "wet" system composed of a spray tower in which the flue gas contacts a mist of droplets of an aqueous slurry of sorbent particles, such as hydrated lime or portlandite ($Ca(OH)_2$) and limestone ($CaCO_3$). Water evaporation reduces the flue gas temperature to about 50° C. to about 70° C. at which the desulfurization process is most efficient. The sorbent particles react with $SO_2$ in the flue gas to form insoluble calcium sulfite ($CaSO_3$), which reacts with oxygen to produce gypsum ($CaSO_4.2H_2O$). In such manner, about 95% of the $SO_2$ is removed from the flue gas stream.

To ensure energy efficient leaching, precipitation and carbonation, the upcycled concrete manufacturing process taps or sources the flue gas line at about 150° C. before the FGD to operate the leaching and precipitation reactors at about 20° C. to about 90° C. or about 70° C. to about 90° C. (depending on ambient weather and desired leaching rates) and re-injects colder flue gas back into the FGD, albeit above the dew point (e.g., >about 140° C. and up to, for example, about 160° C.). The integration points are illustrated in FIG. 3. A set of finned-tube heat exchangers (FTHX, see FIG. 1) that transfer residual heat from the flue gas to a liquid water feeding the leaching and precipitation reactors 102 and 106 at an effectiveness of about 0.2 or greater can be used. A mass flow rate of the flue gas leaving the FTHX can be adjusted to ensure that the temperature does not fall below the acid dew point (e.g., about 140° C.). Finally, if leaching is done at elevated temperatures, a temperature swing process can include a single pass crossflow heat exchanger (CFHX, see FIG. 1) to transfer heat from the hot ion solution leaving the leaching reactor 102 to a solution feeding the leaching reactor 102. These various heat recovery measures can reduce energy costs of the overall process and of the individual sub-systems. The choice of FTHX of some embodiments is given that a heat transfer coefficient on a flue gas side is small and therefore fins are desired to increase an effectiveness of liquid/gas heat exchange. However, for liquid/liquid heat exchange, a single pass CFHX is sufficient. Other types of heat exchangers also may be included.

(II) Two-Stage Carbonation Cycle

Mineralization of $CO_2$ (carbonation) is proposed as a viable route for CCU. For example, portlandite ($Ca(OH)_2$) carbonation is a route to produce near carbon-neutral building materials. The carbonation involves the reaction of $CO_2$ with portlandite to form limestone ($CaCO_3$), as described by: $Ca(OH)_2 + CO_2 \rightarrow CaCO_3 + H_2O$.

Figure 4A:
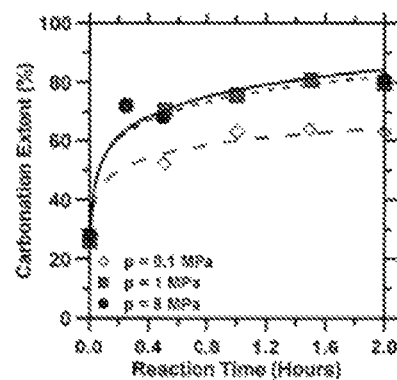
FIG. 4A. Extent of carbonation of $Ca(OH)_2$ particulates as a function of time at different $CO_2$ pressures.

In this reaction, a $CO_2$-capturing reagent (e.g., portlandite) can be in solution or a slurry form, or in the form of a structural component, while $CO_2$ can be provisioned as a liquid, a supercritical fluid, or a vapor. The reaction can be carried out in a pressurized reactor, since the $CO_2$ partial pressure affects reaction kinetics, although non-pressurized (e.g., ambient pressure) processing is also possible. FIG. 4A displays an extent of a carbonation reaction as a function of reaction time, for carbonation of portlandite under substantially constant $CO_2$ partial pressures of about 0.1 MPa, about 1 MPa, and about 8 MPa at room temperature. It can be seen that carbonation initially proceeds rapidly and achieves more than about 50% completion after about 0.5 hours under all three partial pressures. However, the carbonation reaction proceeds more slowly in later stages, and the maximum extent of reaction that can be achieved becomes markedly dependent on the $CO_2$ partial pressure (see FIG. 4B, which displays the extent of the carbonation reaction after about 1 hour of reaction time as a function of $CO_2$ partial pressure). Therefore, as high a $CO_2$ pressure as practical, or as high a $CO_2$ concentration as practical, would typically have to be provisioned during the later stages of the reaction to achieve a high reaction speed and a desired carbonation level.

The upcycled concrete process can divert the scrubbed flue gas that is secured post-desulfurization, namely after the FGD, into the carbonation reactor 112 (see FIG. 3). The flue gas of a coal-fired power plant typically includes about 12% to about 15% of $CO_2$ (v/v). To obtain a corresponding carbonation speed as with substantially pure $CO_2$, a gas mixture can be pressurized to obtain a same $CO_2$ partial pressure, calculated as a product of an overall gas pressure and a $CO_2$ concentration. The $CO_2$ concentration in the gas mixture can be enriched with technologies such as chemical absorption or membrane separation. The enriched gas mixture may then be pressurized, if specified, to obtain a high $CO_2$ partial pressure. However, additional challenges arise, since $CO_2$ is consumed and removed from the gas mixture continuously during the reaction. As such, the $CO_2$ concentration, as well as the overall gas pressure, reduces as the reaction proceeds in a typical carbonation reaction, leading to diminishing $CO_2$ partial pressure towards a later stage of reaction. This impacts the late stage reaction speed and restricts a final carbonation level.

To address this issue in a comparative carbonation reaction, a high $CO_2$ partial pressure can be maintained through the reaction by either (i) increasing an overall gas pressure in a later stage, which can incur a substantial energy cost associated with gas compression, or (ii) enriching a gas mixture with a higher initial $CO_2$ concentration (or a higher purity $CO_2$), wherein the throughput of a $CO_2$ enrichment process becomes a constraining factor, and where considerable $CO_2$ remains in the gas mixture upon completion of carbonation. These options are problematic for CCU at industrial scale, as CCU relies on achieving a high reaction speed (thus a high production throughput) with a low energy input.

To resolve this issue, the $CO_2$ partial pressure condition can be reversed by a two-stage carbonation process. In a first pre-carbonation stage, a carbonation reaction is conducted using a gas with a low $CO_2$ concentration (e.g., pressurized or not), such as a mixture of a flue gas and an exhaust gas recycled at the end of the carbonation reaction. Once the gas becomes $CO_2$-depleted, the gas is replaced in a second stage by a $CO_2$-enriched gas (e.g., pressurized or not), such as untreated flue gas or $CO_2$-enriched flue gas, to finish the second stage of the reaction. The exhaust gas from the second stage is recycled and reused in the preceding stage to enhance a proportion of $CO_2$ captured. This process is flexible, and can incorporate $CO_2$-enrichment technologies (e.g., membrane separation) and pressurization to further enhance the reaction kinetics and $CO_2$ capture efficiency. In such cases, optimal process conditions for the two-stage carbonation can be determined from a process model.

To obtain optimal process conditions for the two-stage carbonation reaction, a process model can be constructed and process parameters can be determined as follows.

Figure 4B:
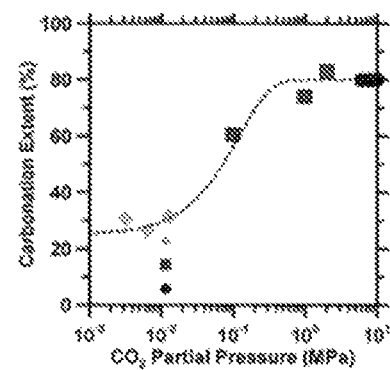
FIG. 4B. Data of the extent of carbonation after about 1 hour as a function of $CO_2$ partial pressure.

1) A $CO_2$ partial pressure during the second carbonation stage is first selected for maximum reaction extent (e.g., about 1 MPa for portlandite carbonation as FIG. 4B shows modest improvement is obtained by further increasing the pressure), although the selected pressure also can be affected by an equipment used (e.g., by a concentration achieved by enrichment together with a pressure allowed by a reactor).

2) An allowed $CO_2$ pressure (or concentration) drop is also determined from the sensitivity of the reaction extent to the pressure (e.g., the slope in FIG. 4B). From here, a total amount of $CO_2$ captured during a given period (determined from a target carbonation level and a quantity of $CO_2$-capturing reagent, such as portlandite, which will be processed during the period) is divided into two parts, $p_1$ and $p_2$, representing the $CO_2$ that will be captured in the first and second stages, respectively. These parameters determine the residual $CO_2$ in the gas after the second stage and the carbonation extent at the end of first stage. Since the exhaust gas from the second stage still has a relatively high $CO_2$ concentration, the exhaust gas will be recycled in the first stage during the next batch. If additional $CO_2$ is to be added to reach $p_1$, additional gas (e.g., a flue gas) will be mixed with the recycled gas, an amount of which can be calculated from $p_1$, the $CO_2$ concentration of the recycled gas, and the allowed concentration drop during carbonation. With these values, the $CO_2$ concentration specified for the first stage can then be calculated, and a reaction time to complete the first stage under a given pressure can be determined from reaction rate data. Finally, a ratio $p_1:p_2$ and the pressure during the first stage are optimized to reduce the reaction time and enhance $CO_2$ capture under given constraints such as the pressure allowed by the reactor and enrichment process throughput.

Figure 4C:
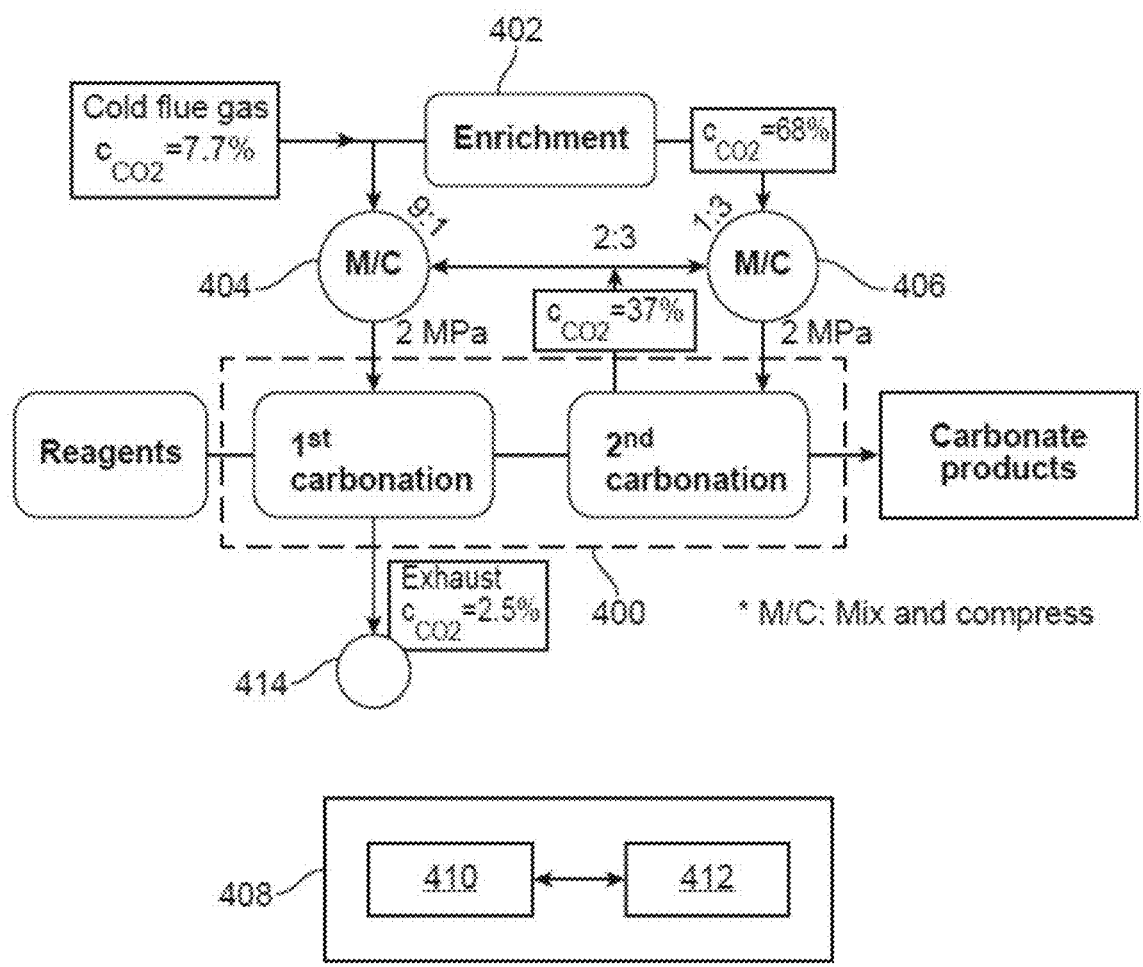
FIG. 4C. An illustration of a two-stage carbonation process. Conditions during an example setup for gas-fired flue gas stream are indicated.

FIG. 4C shows a sub-system of some embodiments for the carbonation process including a pressurized reaction chamber 400 integrated with a $CO_2$-enrichment component 402 (e.g., configured to provide about 8.8× enrichment in $CO_2$ concentration from a starting concentration of about 7.7 mol. %) and pressurization up to about 2 MPa via a pair of mixer/compressors 404 and 406. Comparing to a carbonation process without the two-stage carbonation cycle, the depicted sub-system can reduce an energy cost from compression by about 40% if a same level of $CO_2$ capture is obtained by compressing gas to compensate for the decrease in $CO_2$ partial pressure. The sub-system also uses about 50% less $CO_2$-enriched gas to obtain an equal amount of $CO_2$ capture at a same throughput.

Referring to FIG. 4C, a portion of a flue gas (e.g., having a $CO_2$ concentration of about 7.7 mol. %) is combined with a recycled gas (e.g., having a $CO_2$ concentration of about 37 mol. %) in the mixer/compressor 404 to obtain a pressurized gas mixture, which is then introduced into the pressurized reaction chamber 400 to perform a first stage carbonation of a $CO_2$-capturing reagent, such as in the form of a structural component or another form. Another portion of the flue gas is subjected to enrichment by the $CO_2$-enrichment component 402 (e.g., to yield an enriched $CO_2$ concentration of about 68 mol. %), and is combined with the recycled gas in the mixer/compressor 406 to obtain a pressurized gas mixture, which is then introduced into the pressurized reaction chamber 400 to perform a second stage carbonation. A partial pressure of $CO_2$ (or a $CO_2$ concentration) in the gas mixture as introduced in the second stage of carbonation is greater than a partial pressure of $CO_2$ (or a $CO_2$ concentration) in the gas mixture as introduced in the first stage of carbonation, and is greater than a partial pressure of $CO_2$ (or a $CO_2$ concentration) remaining in the gas mixture at the end of the first stage of carbonation, although overall pressures of the introduced gas mixtures can be substantially the same (e.g., about 2 MPa). A controller 408 (e.g., including a processor 410 and an associated memory 412 connected to the processor 410 and storing processor-executable instructions) can be included to direct operation of various components of the sub-system shown in FIG. 4C.

It is noted that the two carbonation stages can be performed in the same pressurized reaction chamber 400 by replacing a gas phase reactant using a gas exchange mechanism (e.g., including a pump 414 and the mixer/compressors 404 and 406, along with valve(s), duct(s), and so forth) connected to the pressurized reaction chamber 400, without conveying partially carbonated solid or slurry materials from one chamber to another chamber. Additional carbonation stages can be included to implement multi-stage processes to further mitigate a drop in $CO_2$ partial pressure during each carbonation stage. Thus, for example, a multi-stage carbonation process, in general, can include 2, 3, 4, 5, or more carbonation stages, and where additional gas phase reagent including $CO_2$ is introduced in an $i^{th}$ stage to mitigate a drop in $CO_2$ partial pressure during a preceding $(i-1)^{th}$ stage.

In another example implementation, a two-stage process can be applied by directly utilizing gas-phase $CO_2$ sources without additional pressurization or enrichment processes, for example, direct $CO_2$ capture from industrial flue gases. In such cases, the first carbonation stage uses an exhaust gas mixture from a previous carbonation cycle, which has been partially processed by a $CO_2$-capturing reagent and has a lower $CO_2$ concentration, and as such, a lower $CO_2$ partial pressure, than an untreated gas mixture. The partially-treated gas mixture is reacted with a fresh batch of the $CO_2$-capturing reagent, which is in excess amount so that a fast reaction kinetics can be obtained. Once the gas is depleted of $CO_2$, it is replaced with an untreated gas mixture to start the second carbonation stage. In this stage, the $CO_2$-capturing reagent is consumed and the gas becomes partially treated, which is used in the next carbonation cycle. By maintaining one of the reagents in excess (e.g., the $CO_2$-capturing reagent during the first stage and $CO_2$ in the gas mixture during the second stage, respectively), the process achieves steady reaction kinetics and high material utilization efficiency. Process optimizations can be carried out similarly as discussed before. As an example, flue gases emitted from power plants typically have $CO_2$ concentrations from about 4 mol. % to about 20 mol. %, which translates to $CO_2$ partial pressures from about 0.004 MPa to about 0.02 MPa under ambient pressure. Depending on the $CO_2$-capturing reagent, the second carbonation stage can be designed to allow about 30% to about 70% drop in the $CO_2$ partial pressure, for example, to exhaust when the $CO_2$ partial pressure drops to about 0.0012 MPa to about 0.014 MPa, while the first carbonation stage can be designed to scrub $CO_2$ from the exhausted gas to desired concentration, for example, about 400 ppm to about 1000 ppm.

Example

The following example describes specific aspects of some embodiments of this disclosure to illustrate and provide a description for those of ordinary skill in the art. The example should not be construed as limiting this disclosure, as the example merely provides specific methodology useful in understanding and practicing some embodiments of this disclosure.

Clinkering-Free Cementation by Fly Ash Carbonation

Overview:

The production of ordinary portland cement (OPC) is a $CO_2$ intensive process. Specifically, OPC clinkering reactions involve substantial energy in the form of heat, and also result in the release of $CO_2$ from both the de-carbonation of limestone and the combustion of fuel to provide heat. To create alternatives to this $CO_2$ intensive process, this example demonstrates a route for clinkering-free cementation by carbonation of fly ash, which is a by-product of coal combustion. It is shown that in moist environments and at sub-boiling temperatures, Ca-rich fly ashes react readily with gas-phase $CO_2$ to produce robustly cemented solids. After seven days of exposure to vapor-phase $CO_2$ at about 75° C., such formulations achieve a compressive strength of about 35 MPa and take up about 9% $CO_2$ (by mass of fly ash solids). On the other hand, Ca-poor fly ashes due to their reduced alkalinity (low abundance of mobile Ca- or Mg-species), show reduced potential for $CO_2$ uptake and strength gain—although this deficiency can be somewhat addressed by the provision of supplemental or extrinsic Ca-containing reagents. The roles of $CO_2$ concentration and processing temperature are discussed, and linked to the progress of reactions and the development of microstructure. The outcomes create pathways for achieving clinkering-free cementation while providing the beneficial utilization ("upcycling") of emitted $CO_2$ and fly ash, which are two abundant, but underutilized industrial by-products.

Introduction:

Over the last century, for reasons of its low-cost and the widespread geographical abundance of its raw materials, OPC-concrete has been used as the primary material for the construction of buildings and other infrastructure. However, the production of OPC is a highly energy—and $CO_2$—intensive process. For example, at a production level of about 4.2 billion tons annually (corresponding to >about 30 billion tons of concrete produced), OPC production accounts for about 3% of primary energy use and results in about 9% of anthropogenic $CO_2$ emissions, globally. Such $CO_2$ release is attributed to factors including: (i) the combustion of fuel involved for clinkering the raw materials (limestone and clay) at about 1450° C., and (ii) the release of $CO_2$ during the calcination of limestone in the cement kiln. As a result, about 0.9 tons of $CO_2$ are emitted per ton of OPC produced. Therefore, there is great demand to reduce the $CO_2$ footprint of cement, and secure alternative solutions for cementation for building and infrastructure construction.

Furthermore, there exist challenges associated with the production of electricity using coal (or natural gas) as the fuel source. For example, coal power is associated with significant $CO_2$ emissions (about 30% of anthropogenic $CO_2$ emissions worldwide), and also results in the accumulation of significant quantities of solid wastes such as fly ash (about 600 million tons annually worldwide). While OPC in the binder fraction of concrete can be replaced by supplementary cementitious materials (SCMs) such as fly ash, the extent of such utilization remains constrained. For example, in the United States, about 45% of fly ash produced annually is beneficially utilized to replace OPC in the concrete. In spite of supportive frameworks, such constrained use is due to factors including: (i) the presence of impurities including air-pollution control (APC) residues and unburnt carbon as a result of which some fly ashes are non-compliant (e.g., as per ASTM C618) for use in traditional OPC concrete, due to durability concerns, and, (ii) increasing cement replacement (fly ash dosage) levels to greater than about 25 wt. % is often associated with extended setting times and slow strength gain resulting in reduced constructability of the concrete.

Accordingly, there is a demand to valorize or beneficially utilize ("upcycle") vapor and solid wastes associated with coal power production. However, given the tremendous scale of waste production, there is a demand to secure upcycling opportunities of some prominence; for example, within the construction sector wherein large-scale utilization of upcycled materials can be achieved. This condition can be satisfied if the "upcycled solution" is able to serve as an alternative to OPC (and OPC-concrete) so long as it is able to fulfill the functional and performance specifications of construction. Mineral carbonation (conversion of vapor phase $CO_2$ into a carbonaceous mineral, such as $CaCO_3$) is proposed as a route to sequester $CO_2$ in alkaline minerals. In such a process, $CO_2$ is sequestered by the chemical reaction of $CO_2$ streams with light-metal oxides to form thermodynamically stable carbonates; thus allowing permanent and safe storage of $CO_2$. While different alkaline waste streams can be examined to render cementation solutions, the low production throughput, or severe operating conditions (high temperature and elevated $CO_2$ pressure) can render comparative solutions difficult to implement at a practical scale. Therefore, to synergize the utilization of two abundant by-products from coal-fired power plants (fly ash and $CO_2$ in flue gas), this example demonstrates clinkering-free cementation via fly ash carbonation. It is shown that Ca-rich fly ashes react readily with $CO_2$ under moist conditions, at atmospheric pressure and at sub-boiling temperatures. The influences of Ca availability in the fly ash, $CO_2$ concentration, and processing temperature on reaction kinetics and strength gain are discussed. Taken together, this example demonstrates routes for simultaneous valorization of solid wastes and $CO_2$, in an integrated process.

Materials and Methods:
Materials

Class C (Ca-rich) and Class F (Ca-poor) fly ashes compliant with ASTM C618 were used. An ASTM C150 compliant Type I/II ordinary portland cement (OPC) was used as a cementation reference. The bulk oxide compositions of the fly ashes and OPC as determined by X-ray fluorescence (XRF) are shown in Table 1. The crystalline compositions of the Ca-rich and Ca-poor fly ashes as determined using X-ray diffraction (XRD) are shown in Table 2. It should be noted that these two fly ashes were used since they represent typical Ca-rich and Ca-poor variants in the United States, and since Ca content can strongly influence the extent of $CO_2$ uptake and strength development of carbonated fly ash formulations.

TABLE 1

The oxide composition of fly ashes and OPC as determined using X-ray fluorescence (XRF).

| | Mass (%) | | |
|---|---|---|---|
| Simple Oxide | Ca-rich Fly Ash | Ca-poor Fly Ash | Type I/II OPC |
| $SiO_2$ | 35.44 | 53.97 | 20.57 |
| $Al_2O_3$ | 17.40 | 20.45 | 5.19 |
| $Fe_2O_3$ | 7.15 | 5.62 | 3.44 |
| $SO_3$ | 2.34 | 0.52 | 2.63 |
| CaO | 26.45 | 12.71 | 65.99 |
| $Na_2O$ | 1.90 | 0.57 | 0.17 |
| MgO | 5.73 | 2.84 | 1.37 |
| $K_2O$ | 0.53 | 1.11 | 0.31 |
| $P_2O_5$ | 0.95 | 0.30 | 0.08 |
| $TiO_2$ | 1.19 | 1.29 | 0.26 |
| Density ($kg/m^3$) | 2760 | 2470 | 3150 |
| Specific surface area ($SSA, m^2/kg$)[1] | 4292.6 | 616.8 | 442.6 |

[1] The surface area of the Ca-rich (Class C) fly ash is overestimated by $N_2$ adsorption due to the presence of unburnt carbon. However, based on kinetic analysis of reaction rates in OPC + fly ash + water systems, it can be inferred that the reactive surface areas of both the Ca-rich and Ca-poor fly ashes are similar to each other, and that of OPC.

TABLE 2

The mineralogical composition of fly ashes and OPC as determined using quantitative X-ray diffraction (XRD) and Rietveld refinement.

| | Mass (%) | | |
|---|---|---|---|
| Composition | Ca-rich Fly Ash | Ca-poor Fly Ash | Type I/II OPC |
| Lime (CaO) | 1.16 | — | 0.5 |
| Periclase (MgO) | 3.81 | 0.30 | — |
| Quartz ($SiO_2$) | 10.06 | 16.64 | — |
| Calcite ($CaCO_3$) | 0 | 0 | 4.60 |
| Mullite ($Al_6Si_2O_{13}$) | 0.86 | 5.08 | — |
| Anhydrite ($CaSO_4$) | 2.80 | 0.97 | 1.2 |
| Gypsum ($CaSO_4 \cdot 2H_2O$) | — | — | 1.1 |
| Magnetite ($Fe_3O_4$) | 1.66 | 1.76 | — |
| Merwinite ($Ca_3Mg(SiO_4)_2$) | 6.98 | — | — |
| Gehlenite ($Ca_2Al_2SiO_7$) | 4.45 | — | — |
| $Ca_2SiO_4$ ($C_2S$) | 4.93 | — | 18.00 |
| $Ca_4Al_2Fe_2O_{10}$ ($C_4AF$) | — | — | 11.40 |
| $Ca_3Al_2O_6$ ($C_3A$) | 8.03 | — | 6.30 |
| $Ca_3SiO_5$ ($C_3S$) | — | — | 56.50 |
| Amorphous | 55.26 | 75.25 | — |

Experimental Methods

Particle Size Distribution and Specific Surface Area

The particle size distribution (PSD) of OPC was measured using static light scattering (SLS) using a Beckman Coulter LS13-320 particle sizing apparatus fitted with an about 750 nm light source. The solid was dispersed into primary particles via ultrasonication in isopropanol (IPA), which was also used as the carrier fluid. The complex refractive index of OPC was taken as 1.70+0.10i. The uncertainty in the PSD was about 6% based on six replicate measurements. From the PSD, the specific surface area (SSA, units of $m^2/kg$) of OPC was calculated by factoring in its density of about 3150 $kg/m^3$, whereas the SSAs of the fly ashes were determined by $N_2$-BET measurements.

Carbonation Processing

Figure 5:
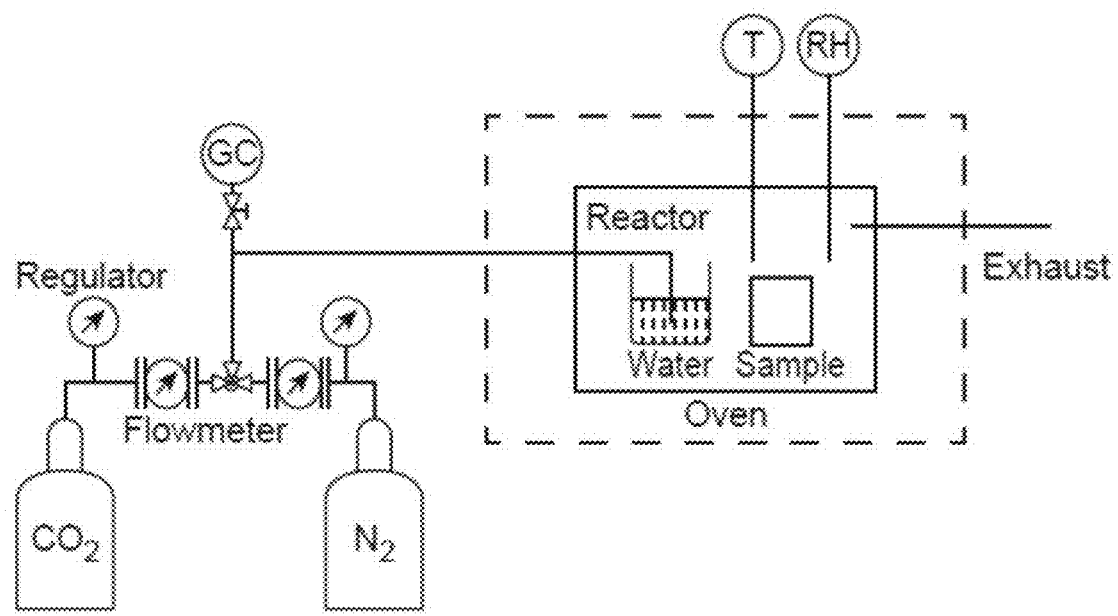
FIG. 5. A schematic of a carbonation reactor showing vapor streams, sample placement, and monitoring and control units (e.g., flow-meters, pressure regulators, temperature/relative humidity (T/RH) meters, and gas chromatograph (GC)).

Fly ash particulates were mixed with deionized (DI) water in a planetary mixer to prepare dense suspensions—pastes having w/s=about 0.20 (w/s, water-to-solids ratio, mass basis) which provided sufficient fluidity such that they can be poured—following ASTM C192. The pastes were cast into molds to prepare cubic specimens with a dimension of about 50 mm on each side. Following about 2 hours of curing in the molds at a temperature T=45±0.2° C. and relative humidity RH=50±1%, the specimens were demolded after which on account of evaporation they featured a reduced water content, with w/s=about 0.15, but were able to hold form; that is, they were shape stabilized. At this time, the cubes were placed in a carbonation reactor, a schematic of which is shown in FIG. 5.

Gas-phase $CO_2$ at atmospheric pressure with a purity of about 99.5% ("pure $CO_2$") was used for carbonation. On the other hand, about 99% pure $N_2$ at atmospheric pressure was used as a control vapor that simulated ambient air (with a $CO_2$ abundance of about 400 ppm). In addition, a simulated flue gas was created by mixing the pure $N_2$ and pure $CO_2$ streams to yield a vapor with about 12% $CO_2$ (v/v) as confirmed using an Inficon F0818 gas chromatography (GC) instrument. Prior to contacting the samples, all vapor streams were bubbled into an open, water-filled container to produce a condensing environment in the reactor (as shown in FIG. 5). Each of the vapors was contacted with the cubical samples at temperatures of 45±0.2° C., 60±0.2° C., and 75±0.2° C.

Compressive Strength

The compressive strengths of the fly ash cubes (both control samples, and those exposed to $CO_2$) were measured at about 1 day intervals following ASTM C109 for up to about 10 days. All strength data reported in this example are the average of three replicate specimens cast from the same mixing batch. For comparison, the compressive strengths of neat OPC pastes prepared at w/s=about 0.30, about 0.40, about 0.50, and about 0.60 were measured after about 1, about 3, about 7, and about 28 days of immersion and curing in a $Ca(OH)_2$-saturated solution ("limewater") at 25±0.2° C.

$CO_2$ Uptake by Fly Ash Formulations $CO_2$ uptake due to carbonation of the fly ashes was quantified by two methods: (i) a mass-gain method, and (ii) thermogravimetric analysis (TGA). The mass-gain method was used to estimate the average $CO_2$ uptake of the bulk cubic specimen from the mass gain of three replicate cubes following $CO_2$ contact as given by Equation (1):

$$w = \frac{m_t - m_i}{m_a} \quad \text{Eq. (1)}$$

where, w (g/g) is the $CO_2$ uptake of a given cube, $m_t$ (g) is the mass of the specimen following $CO_2$ contact over a period of time t (days), $m_i$ (g) is the initial mass of the specimen, and ma (g) is the mass of dry fly ash contained in the specimen (estimated from the mixture proportions). It should be noted that carbonation is an exothermic reaction; thus it can result in the evaporation of water from the sample. However, since curing was carried out in a near-condensing atmosphere, mass measurements before and after carbonation revealed no noticeable mass loss due to (moisture) evaporation. The ratio of $CO_2$ uptake at time t to that assessed at the end of the experiment ($CO_2$ uptake fraction, a) is given by Equation (2):

$$\alpha = \frac{m_t - m_i}{m_f - m_i} \quad \text{Eq. (2)}$$

where $m_f$ (g) is the final mass of a given cubical specimen following about 10 days of $CO_2$ exposure.

TGA was used to determine the extent of $CO_2$ uptake at different depths in the fly ash cubes, from the surface to the center in about 5 mm increments. To accomplish so, cubes were sectioned longitudinally using a hand saw. Then, samples were taken from the newly exposed surface along a mid-line using a drill at a sampling resolution of about ±1 mm. The dust and debris obtained during drilling, at defined locations along the center-line, were collected and pulverized for thermal analysis in a PerkinElmer STA 6000 simultaneous thermal analyzer (TGA/DTG/DTA) provided with a Pyris data acquisition interface. Herein, about 30 mg of the powdered sample that passed an about 53 µm sieve was heated under ultra-high purity (UHP)-$N_2$ gas purged at a flow rate of about 20 mL/min and heating rate of about 10° C./min in pure aluminum oxide crucibles over a temperature range of about 35-to-about 980° C. The mass loss (TG) and differential weight loss (DTG) patterns acquired were used to quantify the $CO_2$ uptake by assessing the mass loss associated with calcium carbonate decomposition in the temperature range about 550° C.≤T≤about 900° C. The mass-based method of assessing the extent of carbonation and the spatially resolved TGA method indicate, on average, similar levels of carbonation, as noted below.

X-Ray Diffraction (XRD)

To qualitatively examine the effects of carbonation, the mineralogical compositions of fly ash mixtures before and after $CO_2$ exposure were assessed using XRD. Here, entire fly ash cubes were crushed and ground into fine powders, and XRD patterns were collected by scanning from about 5-to-about 70° (2θ) using a Bruker-D8 Advance diffractometer in a θ-θ configuration with Cu—Kα radiation (λ=about 1.54 Å) fitted with a VANTEC-1 detector. Representative powder samples were examined to obtain averaged data over the whole cube. The diffractometer was run in continuous mode with an integrated step scan of about 0.021° (2θ). A fixed divergence slit of about 1.00° was used during X-ray data acquisition. To reduce artifacts resulting from preferred orientation and to acquire statistically relevant data, the (powder) sample surface was slightly textured and a rotating sample stage was used.

Scanning Electron Microscopy (SEM)

The morphology and microstructure of the un-carbonated and carbonated fly ash mixtures were examined using a field emission scanning electron microscope provisioned with an energy dispersive X-ray spectroscopy detector (SEM-EDS; FEI NanoSEM 230). First, hardened samples were sectioned using a hand saw. Then, these freshly exposed sections were taped onto a conductive carbon adhesive and then gold-coated to facilitate electron conduction and reduce charge accumulation on the (otherwise) non-conducting surfaces. Secondary electron (SE) images were acquired at an accelerating voltage of about 10 kV and a beam current of about 80 pA.

Thermodynamic Simulations of Phase Equilibria and $CO_2$ Uptake

To better understand the effects of carbonation on the mineralogy and mechanical property development of carbonated fly ashes, thermodynamic calculations were carried out using GEM-Selektor, version 2.3 (GEMS). GEMS is a broad-purpose geochemical modeling code which uses Gibbs energy minimization criteria to compute equilibrium phase assemblages and ionic speciation in a complex chemical system from its total bulk elemental composition. Chemical interactions involving solid phases, solid solutions, and aqueous electrolyte(s) are considered simultaneously. The thermodynamic properties of all the solid and the aqueous species were sourced from the GEMS-PSI database, with additional data for the cement hydrates sourced from elsewhere. The Truesdell-Jones modification of the extended Debye-Hückel equation (see Eq. 3) was used to account for the effects of solution non-ideality:

$$\log \gamma_j = \frac{-A z_j^2 \sqrt{I}}{1 + B \alpha_j \sqrt{I}} + bI + \log_{10} \frac{x_{jw}}{X_w} \quad \text{Eq. (3)}$$

where $\gamma_j$ is the activity coefficient of $j^{th}$ ion (unitless); $z_j$ is the charge of $j^{th}$ ion, $\alpha_j$ is the ion-size parameter (effective hydrated diameter of $j^{th}$ ion, A), A ($kg^{1/2} \cdot mol^{-1/2}$) and B ($kg^{1/2} \cdot mol^{-1/2} \cdot m^{-1}$) are pressure, p- and T-dependent Debye-Hückel electrostatic parameters, b is a semi-empirical parameter that describes short-range interactions between charged aqueous species in an electrolyte, I is the molal ionic strength of the solution (mol/kg), $x_{jw}$ is the molar quantity of water, and $X_w$ is the total molar amount of the aqueous phase. It should be noted that this solution phase model is suitable for I≤2.0 mol/kg beyond which, its accuracy is reduced. In the simulations, Ca-rich and Ca-poor fly ashes were reacted with water in the presence of a vapor phase composed of: (a) air (about 400 ppm $CO_2$), (b) about 12% $CO_2$ (about 88% $N_2$, v/v), and, (c) about 100% $CO_2$ (v/v). The calculations were carried out at T=75° C. and p=1 bar. The solid phase balance was calculated as a function of degree of reaction of the fly ash, until either the pore solution is exhausted (constraints on water availability) or the fly ash is fully reacted.

Results and Discussion:

Carbonation Strengthening

Figure 6A:
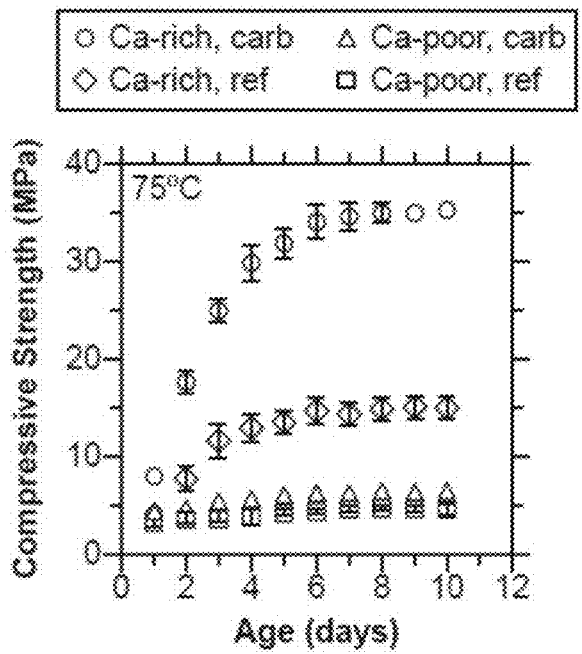
FIG. 6. The evolution of compressive strengths of: (a) Ca-rich and Ca-poor fly ash pastes following $CO_2$ exposure at about 75° C., and the control samples (exposed to pure $N_2$) for comparison, as a function of (carbonation) time in FIG. 6A, (b) hydrated OPC pastes at different ages after curing in limewater at about 23° C., as a function of w/s in FIG. 6B. The dashed black line shows the compressive strength of a Ca-rich fly ash formulation following its exposure to $CO_2$ at about 75° C. for about 7 days, (c) Ca-rich fly ash pastes carbonated at different temperatures following exposure to about 99.5% $CO_2$ (v/v) and simulated flue gas (about 12% $CO_2$, v/v), as a function of time in FIG. 6C, and, (d) Ca-enriched (with added $Ca(OH)_2$, or dissolved $Ca(NO_3)_2$) Ca-poor (Class F) fly ash pastes following $CO_2$ exposure at about 75° C., as a function of time in FIG. 6D. The compressive strengths of the pristine Ca-poor fly ash with and without carbonation are also shown for comparison.

FIG. 6A shows the compressive strength development as a function of time for Class C (Ca-rich) and Class F (Ca-poor) fly ash pastes carbonated in pure $CO_2$ at about 75° C. The Ca-rich fly ash formulations show rapid strength gain following exposure to $CO_2$, particularly during the first 6 days. For example, after about 3 days of $CO_2$ exposure, the carbonated formulation achieves a strength of about 25 MPa, whereas a strength on the order of about 35 MPa is produced after about 7 days of $CO_2$ exposure. On the other hand, as also seen in FIG. 6A, when the Ca-rich formulation was exposed to $N_2$ at the same T, RH, and gas flow rate (serving as a "control" system), a strength of about 15 MPa develops after 7 days, due to limited reaction of a small quantity of readily soluble Ca-compounds with any available silica, water, and ambient $CO_2$. As such, the level of strength developed in the control system is less than half of that in the carbonated (Ca-rich) fly ash formulation. The extent of strength development that is noted in the carbonated system is significant as it indicates that carbonated binders can fulfill code-based (strength) criteria relevant to structural construction (≥about 30 MPa as per ACI 318).

Figure 6B:
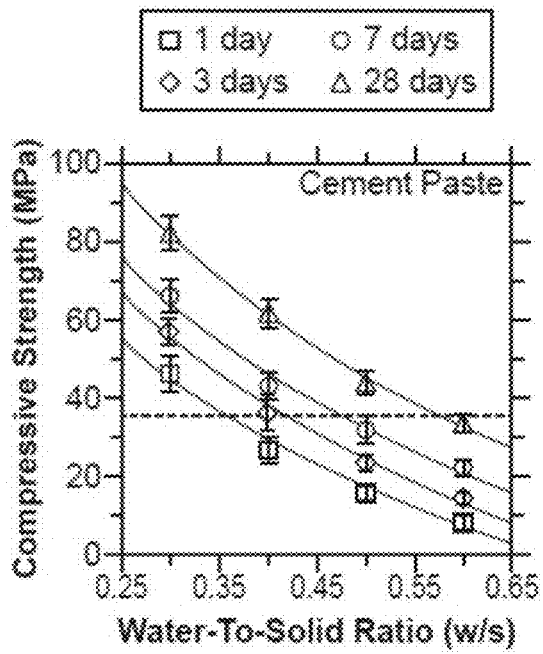

To provide a point of reference, the compressive strengths of neat-OPC formulations were measured across a range of w/s. For example, FIG. 6B shows that the compressive strength of a Ca-rich fly ash formulation following exposure to $CO_2$ for about 7 days at about 75° C. —about 35 MPa—corresponds to that of an OPC formulation prepared at w/s of about 0.50 and cured in limewater at about 23° C. over the same time period. It is noted, however, that the fly ash formulations show a reduced rate of strength gain after about 7 days—likely due to the consumption of readily available species (Ca, Mg) that can form carbonate compounds. On the other hand, OPC systems show a strength increase on the order of about 30% from about 7 days to about 28 days (a common aging period that is noted in building codes) of maturation across all w/s.

Figure 8:
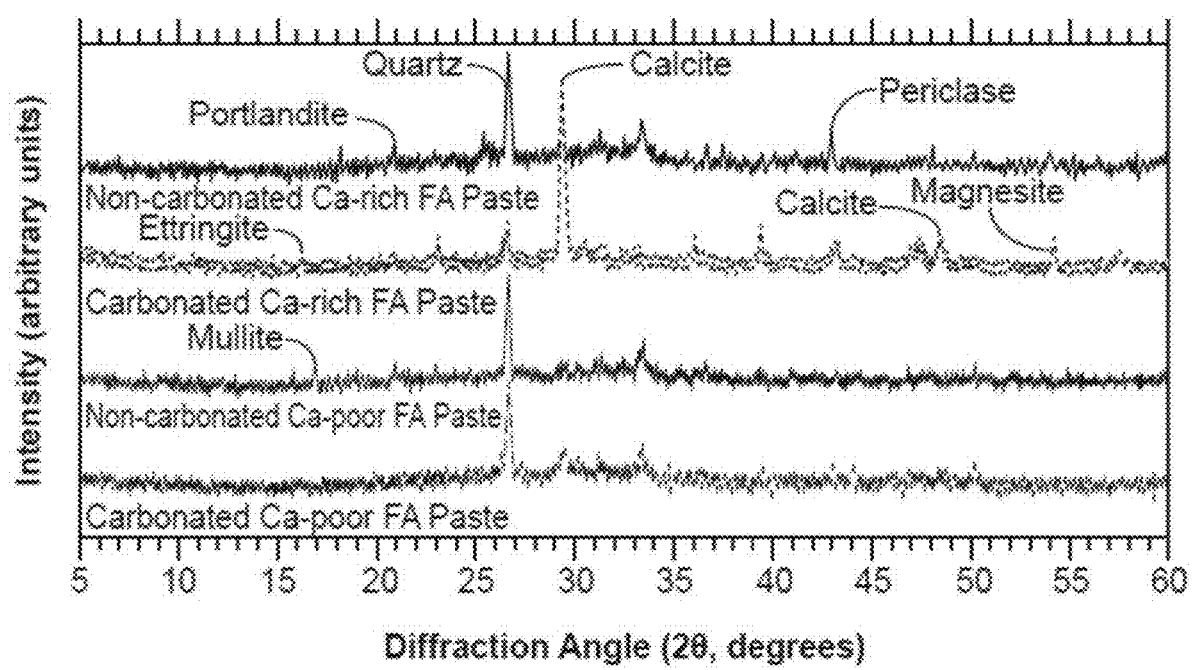
FIG. 8. Representative X-ray diffraction (XRD) patterns of Ca-rich and Ca-poor fly ash formulations before and after exposure to $CO_2$ at about 75° C. for about 10 days. The Ca-poor fly ash shows no noticeable change in the nature of compounds present following exposure to $CO_2$.
Figure 9A:
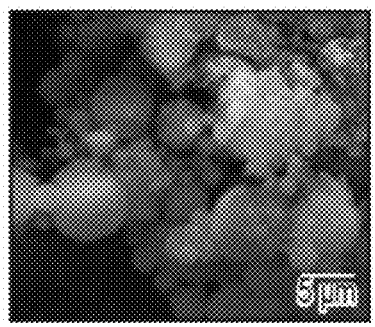
FIG. 9. Representative scanning electron microscopy (SEM) micrographs of: (a) a Ca-rich fly ash formulation following exposure to $N_2$ at about 75° C. for about 10 days in FIG. 9A; a magnified image highlighting the surface of a fly ash particle is shown in FIG. 9B, (c) a Ca-rich fly ash formulation following exposure to pure $CO_2$ at about 75° C. for about 10 days in FIG. 9C; a magnified image highlighting the surface of a carbonated fly ash particle wherein carbonation products in the form of calcite are visible on the particle surface is shown in FIG. 9D, (e) a Ca-poor fly ash formulation following exposure to pure $CO_2$ at about 75° C. for about 10 days in FIG. 9E, and (f) $Ca(OH)_2$-enriched Ca-poor fly ash formulation following exposure to pure $CO_2$ at about 75° C. for about 10 days in FIG. 9F, wherein the somewhat increased formation of calcite is noted on particle surfaces.
Figure 9B:
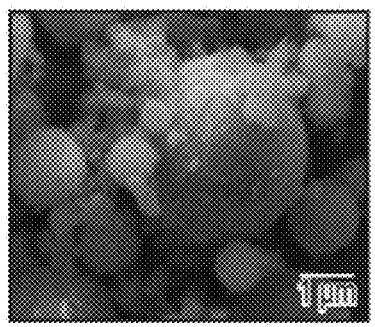
Figure 9C:
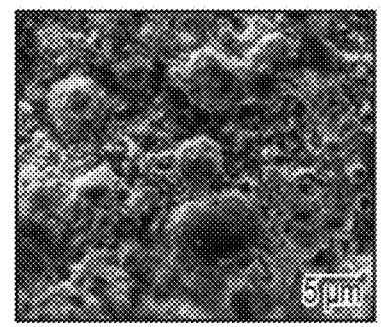
Figure 9D:
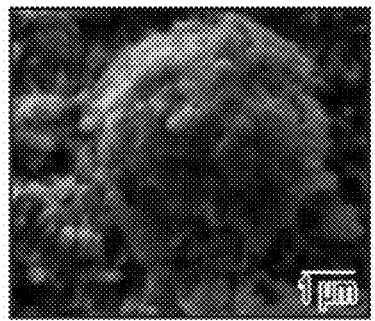
Figure 9E:
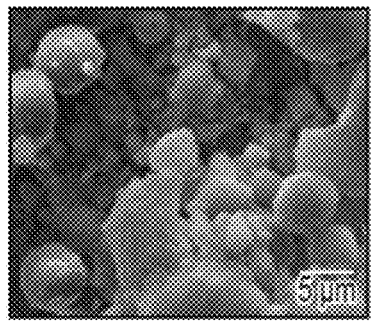
Figure 9F:
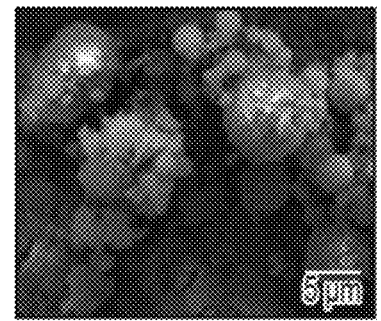

Furthermore, FIG. 6A also indicates that, unlike the "carbonation strengthening" seen in Ca-rich fly ash formulations, Ca-poor fly ash systems showed a strength of ≤about 7 MPa even after about 10 days of carbonation, a gain of ≤about 2 MPa following $CO_2$ exposure vis-à-vis a system cured in a $N_2$ atmosphere. This indicates that, in general, Ca-poor fly ashes feature reduced potential for $CO_2$ mineralization or strength gain following $CO_2$ exposure because the [Ca, Mg] available therein is either insufficient or not easily available for reaction (e.g., see FIG. 8). This indicates that carbonation strengthening is dominantly on account of the presence of reactive, alkaline compounds, namely Ca- and Mg-bearing compounds (e.g., CaO, MgO, and so forth), and Ca present in the fly ash glass (see Tables 1-2), that can react with $CO_2$. It should also be noted that Ca-rich fly ashes contain cementitious phases such as $Ca_2SiO_4$, $Ca_2Al_2SiO_7$, and $Ca_3Al_2O_6$ (see Table 2), which upon hydration (and carbonation) form cementitious compounds such as the calcium-silicate-hydrates (C—S—H), or in a $CO_2$ enriched atmosphere, calcite and hydrous silica (e.g., see FIGS. 7-8). As a result, when such Ca-rich fly ash reacts with $CO_2$ in a moist, super-ambient (but sub-boiling) environment, carbonate compounds such as calcite ($CaCO_3$) and magnesite ($MgCO_3$) are formed as shown in FIGS. 7-8. This is not observed in the Ca-poor fly ash due to both its much lower total [Ca+Mg] content and their lower reactivity (e.g., see FIGS. 7-8, which shows little if any formation of carbonate minerals following $CO_2$ exposure). It should be noted that while the extents of reaction of the fly ashes (Ca-rich or Ca-poor) were not explicitly assessed, it is expected that their degree of reaction is ≤about 25% for the short reaction times and over the temperature conditions of relevance to this example.

In general, upon contact with water, the reactive crystalline compounds (e.g., CaO, $Ca_3Al_2O_6$, and so forth) present in a Ca-rich fly ash are expected to rapidly dissolve in the first few minutes. As the pH systematically increases, with continuing dissolution, alkaline species including Na, K, and Ca can be released progressively from the glassy compounds. This can result in the development of a silica-rich rim on the surfaces of fly ash particles. Pending the presence of sufficient solubilized Ca, and in the presence of dissolved $CO_2$, calcite can form rapidly on the surfaces of leached (and other) particles, thereby helping proximate particles to adhere to each other as the mechanism of carbonation strengthening (e.g., see FIGS. 7-9). This is additionally helped by the liberation of Ca and Si from the anhydrous fly ash, whose reaction with water results in the formation of hydrated calcium silicates (see FIGS. 7-8), calcite, and hydrous silica. This is significant as the hydrated calcium silicates and calcite can feature a mutual affinity for attachment and growth.

With extended exposure to $CO_2$, the hydrated calcium silicates decompose to form calcite and hydrous silica (as shown in FIG. 7), which can also offer cementation. The systematic formation of mineral carbonates in this fashion induces: (i) cementation, for example, in a manner analogous to that observed in mollusks, and sea-shells, that binds proximate particles to each other via a carbonate network, or carbonate formation which ensures the cementation of sandstones, and (ii) an increase in the total volume of solids formed which results in a densification of microstructure, while ensuring $CO_2$ uptake (e.g., see FIG. 7 for scenarios wherein reaction with $CO_2$ results in an increase in solid volume).

Figure 6C:
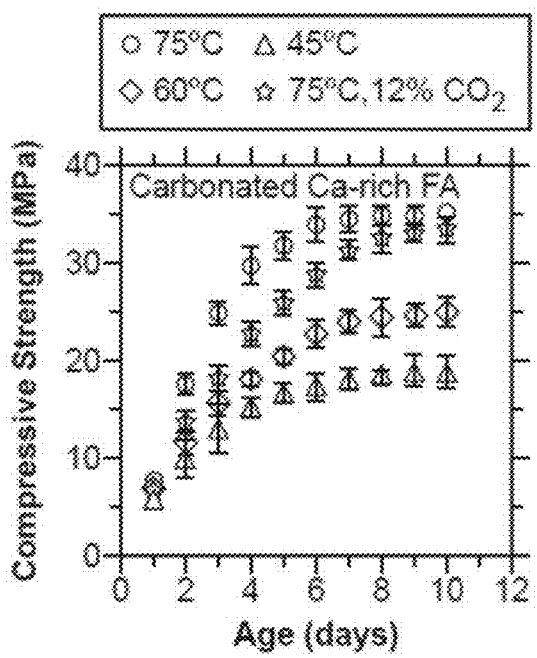

Coming back to ascertaining the ability of flue gas from coal-fired power plants, as is, to carbonate fly ash, the Ca-rich fly ash was carbonated in an about 12% $CO_2$ atmosphere (v/v) at about 75° C. As noted in FIG. 6C, FIG. 7B, and FIG. 7E, $CO_2$ present in flue gas at relevant concentrations can readily carbonate fly ash and ensure strength gain, albeit at a slightly reduced rate vis-à-vis pure $CO_2$ exposure. This reduced rate of strength gain (and carbonation) is on account of the lower abundance of dissolved $CO_2$ in the vapor phase, and hence in the liquid water following Henry's law. However, it should be noted that after about 10 days of exposure to simulated flue gas, the strength of the Ca-rich fly ash formulation corresponded to those cured in a pure-$CO_2$ atmosphere (FIG. 6C). This is significant, as it demonstrates a pathway for clinkering-free cementation by synergistic use of both fly ash and untreated flue gas of dilute $CO_2$ concentrations sourced from coal-fired power plants.

To better assess the potential for valorization of diverse industrial waste streams of $CO_2$, the effects of reaction temperature on carbonation and strength gain were further examined. As an example, flue gas emitted from coal-fired power plants features an exit temperature (TE) on the order of about 50° C.≤TE≤about 140° C. to reduce fouling and corrosion, and to provide a buoyant force to assist in the evacuation of flue gas through a stack. Since heat secured from the flue gas is the primary source of thermal activation of reactions, the carbonation of Ca-rich fly ash formulations and their rate of strength gain were examined across a range of temperatures as shown in FIG. 6C. The rate of strength gain increases with temperature. This is on account of two factors: (i) elevated temperatures facilitate the dissolution of the fly ash solids, and the leaching of the fly ash glass, and (ii) elevated temperatures favor the drying of the fly ash formulation, thereby easing the transport of $CO_2$ into the pore structure which facilitates carbonation. It should however be noted that the solubility of $CO_2$ in water decreases rapidly at temperatures in excess of about 60° C. While in a closed system this may suppress the rate of carbonation, the continuous supply of $CO_2$ provisioned herein, in a condensing atmosphere ensures that little or no retardation in carbonation kinetics is observed despite an increase in temperature. It should also be noted that carbonation reactions are exothermic. Therefore, increasing the reaction temperature is expected to retard reaction kinetics (following Le Chatelier's principle); unless heat were to be carried away from the carbonating material. Of course, such exothermic heat release can further decrease the solubility of $CO_2$ in water by enhancing the local temperature in the vicinity of the reaction zone. As such, several processes including the dissolution of the fly ash solids, leaching of the fly ash glass, and the transport of solubilized $CO_2$ through the vapor phase and water present in the pore structure influence the rate of fly ash carbonation.

Figure 6D:
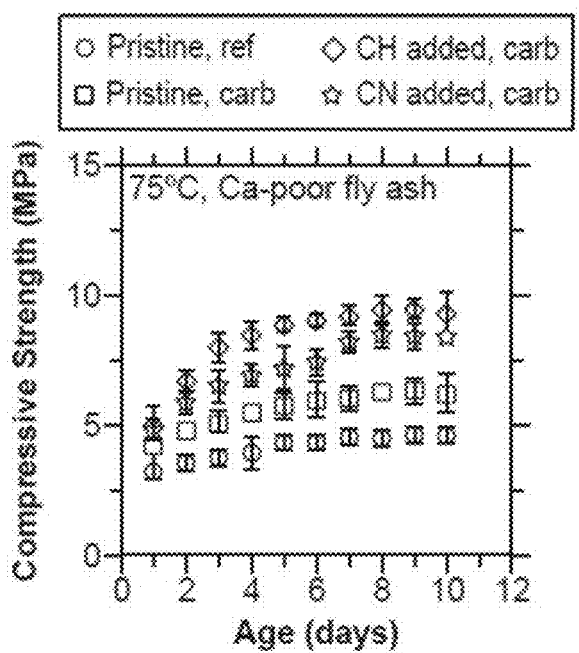

To more precisely isolate the role of Ca content of the fly ash, further experiments were carried out wherein $Ca(OH)_2$ or $Ca(NO_3)_2$ were added to the Ca-poor fly ash in order to produce bulk Ca contents corresponding to the Ca-rich fly ash. Here, it should be noted that while $Ca(OH)_2$ was added as a solid that was homogenized with the fly ash, $Ca(NO_3)_2$ was solubilized in the mixing water. The results shown in FIG. 6D highlight that although the $Ca(OH)_2$- and $Ca(NO_3)_2$-enriched Ca-poor fly ashes experienced substantial strength increases (about 35%) following carbonation as compared to the pristine Ca-poor fly ash, the strengths were lower than that of the Ca-rich fly ash (see FIG. 6A). Nevertheless, the enhancement in strength observed in the Ca-poor formulations is postulated to be on the account of both: (a) the pozzolanic reaction between the added Ca source and silica liberated from the fly ash resulting in the formation of calcium silicate hydrates (C—S—H), and, (b) the formation of calcite and (hydrous) silica gel by the carbonation-decomposition of C—S—H, and by direct reaction of solubilized Ca with aqueous carbonate species. The carbonation of C—S—H can result in the release of free water and the formation of a silica gel with reduced water content, as is also predicted by simulations (see FIG. 7). However, such water release (and increase in the porosity) does not appear to be the cause of the reduced strengths obtained in the Ca-poor fly ash formulations. Rather, it appears as though the presence of reactive Ca intrinsic to the fly ash (glass), and the formation of a silica-rich surface layer to which $CaCO_3$ can robustly adhere results in higher strength development in Ca-rich fly ash formations. Given the reduced ability of Ca-poor fly ashes to offer substantial carbonation-induced strength gain, the remainder of the example focuses on better assessing the effects of $CO_2$ exposure on Ca-rich fly ash formulations.

Indeed, the electron micrographs shown in FIG. 9 provide additional insights into morphology and microstructure development in Ca-rich fly ash formulations following exposure to $N_2$ and $CO_2$ at about 75° C. for about 10 days. First, it is noted that the un-carbonated fly ash formulations show a loosely packed microstructure with substantial porosity (FIG. 9A). Close examination of a fly ash particle shows a "smooth" surface (e.g., see FIG. 9B), although alkaline species might have been leached from the particle's surface. In contrast, FIGS. 9C-D reveal the formation of a range of crystals that resemble "blocks and peanut-like aggregates" on the surfaces of Ca-rich fly ash particles—post-carbonation. XRD (FIG. 8) and SEM-EDS analyses of these structures confirm their composition as that of calcium carbonate (calcite: $CaCO_3$). The role of calcite and silica gel that form in these systems is significant in that such gels serve to reduce the porosity, and effectively bind the otherwise loosely packed fly ash particles (FIG. 9A), thereby ensuring "carbonation strengthening". Ca-poor fly ash particles do not show the formation of carbonation products on their surfaces, in spite of $CO_2$ exposure (see FIG. 9E). Furthermore, the addition of supplemental portlandite to Ca-poor systems results in a somewhat increased level of carbonation product formation on fly ash particle surfaces (see FIG. 9F). These observations highlight the role of not just the Ca (and Mg)-content, but also potentially their spatial distribution on microstructure and strength development in carbonated fly ash systems.

Carbonation Kinetics

Figure 10A:
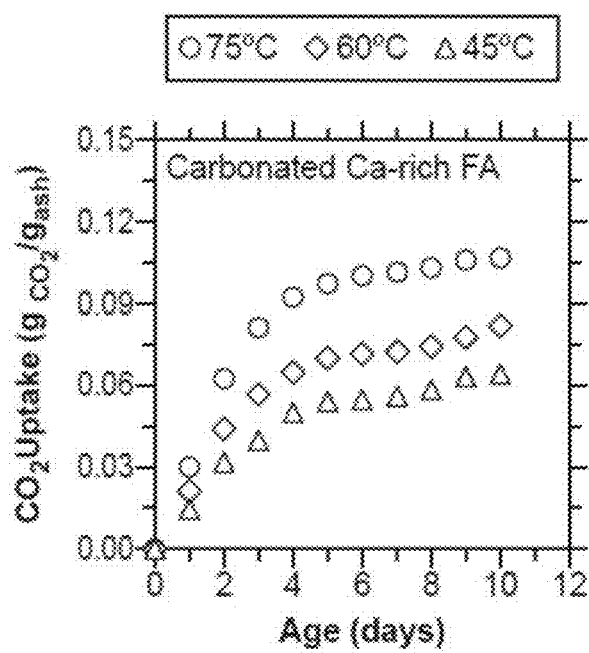
FIG. 10. (a) The $CO_2$ uptake (normalized by the mass of Ca-rich fly ash in the formulation) as a function of time for samples exposed to pure $CO_2$ at different isothermal temperatures in FIG. 10A. The amount of $CO_2$ uptake was estimated using the mass-based method. (b) The compressive strength of the Ca-rich and Ca-poor fly ash samples as a function of their $CO_2$ uptake following exposure to pure $CO_2$ at different temperatures for up to about 10 days in FIG. 10B. The data reveals a strength gain rate of about 3.2 MPa per unit mass of fly ash that has reacted (carbonated). The amount of $CO_2$ uptake was estimated using the mass-based method. (c) The $CO_2$ uptake of a Ca-rich fly ash formulation as a function of depth in FIG. 10C. The macroscopic sample is composed of a cube (about 50 mm×about 50 mm×about 50 mm) that was exposed to pure $CO_2$ at about 75° C. for about 10 days. Herein, $CO_2$ uptake was assessed by thermal analysis (TGA).
Figure 10B:
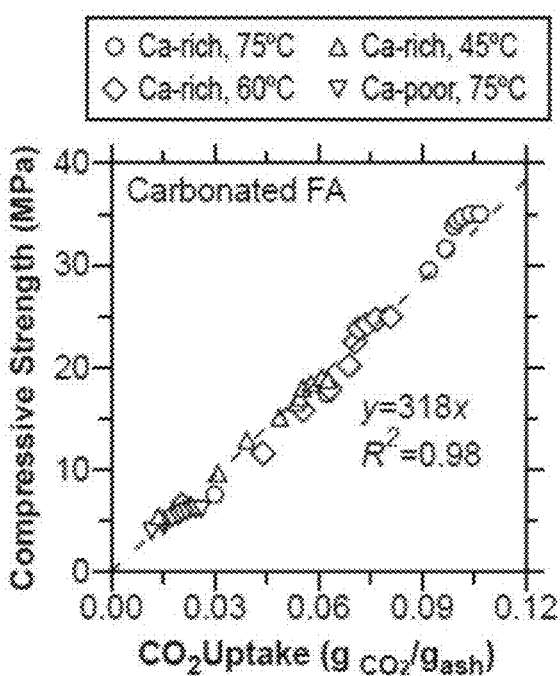

FIG. 10A shows $CO_2$ uptake by the Ca-rich fly ash formulation as determined by thermal analysis (by tracking the decomposition of $CaCO_3$) as a function of time across a range of curing temperatures. Both the rate and extent of $CO_2$ uptake, at a given time, increase with temperature. Although the terminal $CO_2$ uptake (which is a function of chemical composition) might be proposed to be similar across all conditions, this was not observed over the course of these experiments—likely due to kinetic constraints on dissolution, and the subsequent carbonation of the fly ash solids. Nevertheless, a linear correlation between compressive strength evolution and the $CO_2$ uptake of a given mixture is noted (see FIG. 10B)—for both Ca-rich and Ca-poor fly ash formulations. Significantly, a strength gain on the order of about 3.2 MPa per unit mass of fly ash carbonated is realized. It should be noted that the Ca-rich fly ash composition examined herein—in theory—has the potential to take-up about 27.1 wt. % $CO_2$ assuming that all the CaO and MgO therein would carbonate (e.g., see XRF composition in Table 1). Based on the correlation noted in FIG. 10B, realizing the highest maximum carbonation level—at thermodynamic equilibrium—would produce a terminal strength on the order of about 86 MPa independent of the prevailing reaction conditions ($CO_2$ concentration, and temperature). It should be noted however that achieving this terminal level of $CO_2$ uptake may be difficult to achieve in practice due to the time-dependent: (i) formation of carbonate films of increasing thickness which hinders access to the reactants, and (ii) formation of a dense microstructure that hinders the transport of $CO_2$ through the liquid phase to reactive sites.

Broadly, mineral carbonation (the formation of calcite and/or magnesite) typically takes the form of irreversible heterogeneous solid-liquid-gas reactions. In the case of Ca-rich fly ashes, it includes the processes of dissolution and hydration of the Ca-rich compounds including $\beta$-$Ca_2SiO_4$, Ca-rich glasses, CaO, $Mg(OH)_2$, $Ca(OH)_2$, and so forth, and the subsequent precipitation of $CaCO_3$ and $MgCO_3$ from aqueous solution, with reference to, for example, Table 2, FIG. 7, and the following reactions:

$$CO_2(g)+H_2O(l) \leftrightarrow H_2CO_3(aq) \leftrightarrow H^+(aq)+HCO^-_3(aq) \quad \text{Eq. (4)}$$

$$HCO^+_3(aq) \leftrightarrow H^+(aq)+CO^{2-}_3(aq) \quad \text{Eq. (5)}$$

$$XO(s)+H_2O(l) \to X(OH)_2(s) \to X^{2+}(aq)+2OH^-(aq), \text{ where X=Ca, Mg} \quad \text{Eq. (6)}$$

$$X_2SiO_4(s)+4H^+(aq) \to 2X^{2+}(aq)+SiO_2(s)+2H_2O(l) \quad \text{Eq. (7)}$$

$$X^{2+}(aq)+CO^{2-}_3(aq) \to XCO_3(s) \quad \text{Eq. (8)}$$

Simultaneous to the dissolution and hydration of the solids, vapor phase $CO_2$ will dissolve in water, as dictated by its equilibrium solubility (as described by Henry's law) at the relevant pH and temperature. As ionized species from the reactants and dissolved $CO_2$ accumulate in the liquid phase, up to achieving supersaturation—described by the ratio of the ion activity product to the solubility product for a given compound, such as calcite—precipitation occurs thereby reducing the supersaturation level. Ca- or Mg-bearing compounds in the fly ash would continue to dissolve as the solution remains under-saturated with respect to these phases due to the precipitation of carbonates, ensuring calcite and/or magnesite formation until the readily available quantity of these reactant compounds is exhausted and the system reaches equilibrium. It should be noted that in fly ash mixtures, wherein the abundance of alkaline compounds is substantial, where a large Ca/alkaline-buffer exists, the dissolution of gas-phase $CO_2$ which would otherwise acidify the pore solution has little impact on altering the solution pH.

Figure 10C:
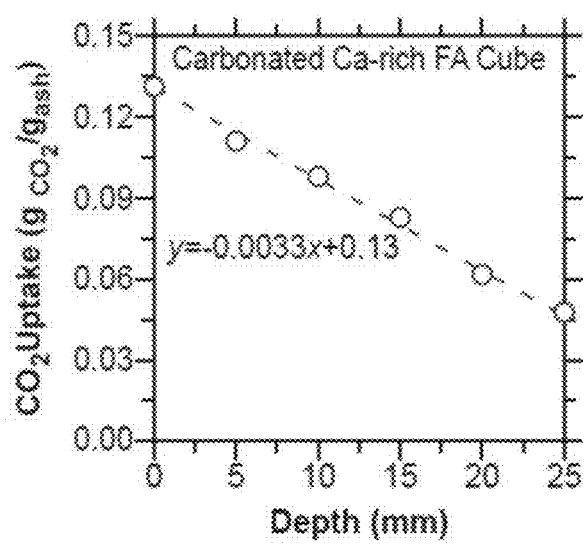

It should furthermore be noted that, in the case of the fly ash cubes tested for compressive strength (following ASTM C109) (see FIG. 10C, and associated thin-section analysis) or in the case of fly ash particulates (e.g., see FIG. 9), in general, carbonation reactions proceed inward from the surface to the interior and the surface reacts faster than the bulk. The kinetics of such reactions can be analyzed by assessing how the rate of conversion of the reactants is affected by process variables. For example, as noted above in FIG. 10A, it is seen that carbonation occurs rapidly at short reaction times, and its rate progressively decreases with increasing reaction time. This nature of rapid early-reaction, followed by an asymptotic reduction in the reaction rate at later times can be attributed to: (i) the nucleation and growth of carbonate crystals which occurs at early reaction times, and whose rate of formation is a function of the surface area of the reactant, and (ii) a diffusion- (transport-) limited process which involves transport of $CO_2$ species to microstructure hindered sites wherein carbonation occurs. Such kinetics can be described by a generalized reaction-diffusion model as shown in the below:

$$\left[1-(1-\alpha)^{\frac{1}{3n}}\right]=kt \quad \text{Eq. (9)}$$

where $\alpha$ is the $CO_2$ uptake ratio (g of $CO_2$ uptake per g of reactant, here fly ash), t is the time (days, d), k ($d^{-1}$) is the apparent reaction rate constant, and n is an index related to the rate-determining step. For example, n=1 represents the "contracting volume model" for rapid initial nucleation and growth of products from the reactants from an outer surface of a spherical shape. When n=2, Equation (9) reduces to Jander's model for diffusion-controlled reactions, wherein the reaction rate is determined by the transport of reactants through the product layer to the reaction interface. It should be noted that herein, the presence of liquid water serves to catalyze carbonation reactions, by offering a high pH medium that can host mobile $CO_3^{2-}$ ions.

Figure 11:
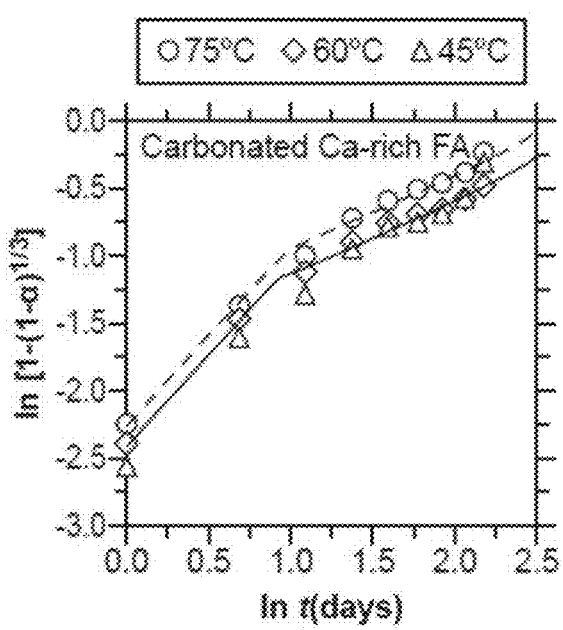
FIG. 11. Fits of an equation for a generalized reaction-diffusion model to experimental carbonation data taken from FIG. 7A for different carbonation temperatures.

FIG. 11 shows fits of Equation (9) to the experimental carbonation data taken from FIG. 10A for different carbonation temperatures. A clear change in slope is noted just prior to a reaction interval of about 2 days. Across all temperatures, initially the slopes (m, unitless) of all the curves, wherein m=1/n, are on the order of: m=1±0.2, while after about 2 days, m=0.5±0.1. The slight deviation of the slopes from their ideal values (n=1 and 2) is postulated to be on account of the wide-size distributions of the fly ash particles and the irregular coverage of particles by the carbonation products, for example as shown in FIG. 9. The rate constants obtained from the fittings shown in FIG. 10A were used to calculate the apparent activation energy of the two steps of carbonation reactions, namely a topochemical reaction step, followed by a diffusion-limited step. This analysis reveals: (i) $E_{a,1}$=about 8.9 kJ/mole for surface nucleation reactions indicative of a small dependence of reaction rate on temperature, and (ii) $E_{a,2}$=about 24.1 kJ/mole for diffusion-controlled reaction. That the activation energy for surface nucleation reaction is much lower than that for diffusion-controlled reaction indicates that the carbonation reaction is dominated by nucleation and growth of carbonation products initially. However, as carbonation reaction progresses, the precipitation of carbonation products results in the formation of a barrier layer on the fly ash particles (see FIG. 9)—that binds the particles together and simultaneously increases the resistance to the transport of $CO_2$ species to carbonation sites. As a result, the transport step assumes rate control in the later stages of carbonation reactions.

CONCLUSIONS

Results set forth in this example demonstrate that exposure to concentrations of $CO_2$ in moist environments, at ambient pressure, and at sub-boiling temperatures can produce cemented solids whose properties are sufficient for use in structural construction. Indeed, Ca-rich fly ash solids, following $CO_2$ exposure achieve a strength of about 35 MPa after about 7 days or so, and take-up about 9% $CO_2$ by mass of reactants. Detailed results from thermodynamic modeling, XRD analyses, and SEM observations indicate that fly ash carbonation results in the formation of a range of reaction products, namely calcite, hydrous silica, and potentially some C—S—H which collectively bond proximate particles into a cemented solid. Careful analysis of kinetic (rate) data using a reaction-diffusion model highlights two rate-controlling reaction steps: (a) where the surface area of the reactants, and the nucleation and growth of carbonate crystals there upon is dominant at early reaction times ($E_{a,1}$=about 8.9 kJ/mole), and (b) a later-age process which involves the diffusion of $CO_2$ species through thickening surficial barriers on reactant sites ($E_{a,2}$=about 24.1 kJ/mole). It is noted that due to their reduced content of accessible [Ca, Mg] species, Ca-poor fly ashes feature reduced potential vis-à-vis Ca-rich fly ashes for $CO_2$ uptake, and carbonation strengthening. Although the provision of extrinsic Ca sources to Ca-poor fly ashes can somewhat offset this reduced content, the observations indicate that not just the total amount (mass abundance) of [Ca, Mg], but also its reactivity and spatial distribution contribute toward determining a fly ash solid's suitability for $CO_2$ uptake and carbonation strengthening. Furthermore, it is noted that strength gain is linearly related to the extent of carbonation ($CO_2$ uptake). This indicates a way to estimate strength gain if the extent of carbonation can be known, or vice-versa. These observations are significant in that they demonstrate a route for producing cemented solids by an innovative clinkering-free, carbonation based pathway.

Implications on Solid and Flue Gas $CO_2$ Waste Valorization in Coal-Fired Power Plants:

Electricity generation from coal and natural gas combustion results in the production of substantial quantities of combustion residues and $CO_2$ emissions. For example, in the United States alone, coal combustion (for electricity production) resulted in the production of nearly about 120 million tons of coal-combustion residuals (CCRs), and about 1.2 billion tons of $CO_2$ emissions in 2016. While some CCRs find use in other industries (e.g., FGD gypsum, fly ash, and so forth), the majority of CCRs continue to be land-filled. For example, in the United States, about 45-55 wt. % of the annual production of fly ash is beneficially utilized—for example, to replace cement in the binder fraction in traditional concrete—while the rest is disposed in landfills. Such underutilization stems from the presence of impurities in the fly ash including unburnt carbon and calcium sulfate that forms due to the sulfation of lime that is injected for air pollution control (APC), compromising the durability of traditional concrete. The materials examined herein, namely fly ashes that are cemented by carbonation, should not be affected by the presence of such impurities—as a result, a wide range of Ca-rich fly ash sources—including those containing impurities, and mined from historical reservoirs ("ash ponds") can be usable for carbonation-based fly ash cementation. Given that fly ash carbonation can be effected at sub-boiling temperatures using dilute, untreated (flue-gas) $CO_2$ streams, the outcomes of this example create a pathway for the simultaneous utilization of both solid- and vapor-borne wastes created during coal combustion. Such routes for waste, and especially $CO_2$ valorization create value-addition pathways that can be achieved without a need for carbon capture (or $CO_2$ concentration enhancement). Importantly, the streamlined nature of this carbonation process ensures that it well-suited for co-location ("bolt-on, stack-tap" integration) with large point-source $CO_2$ emission sites including petrochemical facilities, coal/natural gas fired power plants, and cement plants. In each case, emitted flue gas can be used to provide both waste heat to hasten chemical reactions, and $CO_2$ to ensure mineralization without imposing additional criteria for emissions control. The proposed approach is significant since—within a lifecycle analysis (LCA) framework wherein there is no embodied $CO_2$ impact associated with reactants such as coal combustion wastes or emitted $CO_2$, and wherein processing energy (heat) is secured from the flue gas stream—fly ash carbonation, by virtue of active $CO_2$ uptake, and $CO_2$ avoidance (by diminishing the production and use of OPC) has the potential to yield $CO_2$ negative pathways for cementation, and hence construction.

As used herein, the singular terms "a," "an," and "the" may include plural referents unless the context clearly dictates otherwise. Thus, for example, reference to an object may include multiple objects unless the context clearly dictates otherwise.

As used herein, the term "set" refers to a collection of one or more objects. Thus, for example, a set of objects can include a single object or multiple objects. Objects of a set can be the same or different.

As used herein, the terms "connect," "connected," and "connection" refer to an operational coupling or linking. Connected objects can be directly coupled to one another or can be indirectly coupled to one another, such as via one or more other objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, a first numerical value can be "substantially" or "about" the same as a second numerical value if the first numerical value is within a range of variation of less than or equal to ±10% of the second numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a range of about 1 to about 200 should be understood to include the explicitly recited limits of about 1 and about 200, but also to include individual values such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations are not a limitation of the disclosure.

What is claimed is:

1. A system for manufacturing a concrete product, comprising:
    a leaching reactor;
    a precipitation reactor connected to the leaching reactor;
    a set of heat exchangers thermally connected to the leaching reactor and the precipitation reactor and configured to source heat from a flue gas stream and transfer residual heat from the flue gas to liquid water feeding the leaching and precipitation reactors.

2. The system of claim 1, wherein the set of heat exchangers includes a set of finned-tube heat exchangers.

3. The system of claim 1, further comprising a capacitive concentrator for controlled concentration of calcium ions and/or magnesium ions connected between the leaching reactor and the precipitation reactor.

4. The system of claim 3, wherein the capacitive concentrator includes a set of electrodes and an electrical source connected to the set of electrodes.

5. The system of claim 1, further comprising a carbonation reactor that may be connected to the leaching reactor and the precipitation reactor and configured to source carbon dioxide from the flue gas stream.

6. The system of claim 5, further comprising a mixer connected between the leaching reactor, the precipitation reactor, and the carbonation reactor.

7. The system of claim 6, further comprising an extruder or a pressing, molding, or forming device connected between the mixer and the carbonation reactor.

8. The system of claim 5, wherein the carbonation reactor includes:
    a reaction chamber; and
    a gas exchange mechanism connected to the reaction chamber and configured to:
        expose, during an initial time period, contents of the reaction chamber to a first gas reactant having a first carbon dioxide concentration; and
        expose, during a subsequent time period, the contents to a second gas reactant having a second carbon dioxide concentration that is greater than the first carbon dioxide concentration.

9. A system for manufacturing a concrete product, comprising:
    a leaching reactor;
    a precipitation reactor connected to the leaching reactor;
    a set of heat exchangers thermally connected to the leaching reactor and the precipitation reactor and configured to source heat from a flue gas stream; and
    a capacitive concentrator for controlled concentration of calcium ions and/or magnesium ions connected between the leaching reactor and the precipitation reactor.

10. The system of claim 9, wherein the set of heat exchangers includes a set of finned-tube heat exchangers.

11. The system of claim 9, wherein the capacitive concentrator includes a set of electrodes and an electrical source connected to the set of electrodes.

12. The system of claim 9, wherein the capacitive concentrator for controlled concentration of calcium ions and/or magnesium ions includes a membrane filtration device.

13. The system of claim 12, wherein the membrane filtration device comprises at least one nanofiltration membrane or reverse osmosis membrane.

14. The system of claim 9, further comprising a carbonation reactor that may be connected to the leaching reactor and the precipitation reactor and configured to source carbon dioxide from the flue gas stream.

15. The system of claim 14, further comprising a mixer connected between the leaching reactor, the precipitation reactor, and the carbonation reactor.

16. The system of claim 15, further comprising an extruder or a pressing, molding, or forming device connected between the mixer and the carbonation reactor.

17. The system of claim 14, wherein the carbonation reactor includes:
    a reaction chamber; and
    a gas exchange mechanism connected to the reaction chamber and configured to:
        expose, during an initial time period, contents of the reaction chamber to a first gas reactant having a first carbon dioxide concentration; and
        expose, during a subsequent time period, the contents to a second gas reactant having a second carbon dioxide concentration that is greater than the first carbon dioxide concentration.

18. The system of claim 3, wherein the capacitive concentrator for controlled concentration of calcium ions and/or magnesium ions includes a membrane filtration device.

19. The system of claim 18, wherein the membrane filtration device comprises at least one nanofiltration membrane or reverse osmosis membrane.

20. A method of manufacturing a carbonated concrete product using the system of claim 1, wherein the method comprises:
    subjecting the solids to dissolution in the leaching reactor to yield an solution comprising calcium ions and/or magnesium ions;
    concentrating the calcium and/or magnesium-ion solution;
    transferring at least a portion of the concentrated calcium and/or magnesium-ion solution to the precipitation reactor;
    inducing precipitation of the calcium and/or magnesium-ion solution in the precipitation reactor to yield portlandite;
    forming a cementitious slurry including the portlandite;
    shaping the cementitious slurry into a structural component;
    placing the structural component in a carbonation reactor; and
    exposing the structural component to carbon dioxide sourced from the flue gas stream, thereby forming the carbonated concrete product.

* * * * *